(12) United States Patent
Yoshida et al.

(10) Patent No.: US 8,281,112 B2
(45) Date of Patent: Oct. 2, 2012

(54) PROCESSOR DECODING EXTENSION INSTRUCTION TO STORE PLURAL ADDRESS EXTENSION INFORMATION IN EXTENSION REGISTER FOR PLURAL SUBSEQUENT INSTRUCTIONS

(75) Inventors: Toshio Yoshida, Kawasaki (JP); Mikio Hondou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/338,245

(22) Filed: Dec. 18, 2008

(65) Prior Publication Data
US 2009/0172367 A1      Jul. 2, 2009

(30) Foreign Application Priority Data
Dec. 28, 2007   (JP) ................................. 2007-341387

(51) Int. Cl.
*G06F 9/30* (2006.01)
(52) U.S. Cl. ........................................ 712/226; 712/208
(58) Field of Classification Search .................... None
See application file for complete search history.

(56) References Cited

U.S. PATENT DOCUMENTS

| | | | | |
|---|---|---|---|---|
| 4,109,311 | A * | 8/1978 | Blum et al. .................... | 712/226 |
| 5,177,701 | A | 1/1993 | Iwasa | |
| 6,014,739 | A * | 1/2000 | Christie ......................... | 712/228 |
| 6,167,505 | A * | 12/2000 | Kubota et al. ................. | 712/210 |
| 6,499,099 | B1 * | 12/2002 | Cho ............................... | 712/210 |
| 6,651,160 | B1 * | 11/2003 | Hays .............................. | 712/210 |
| 6,745,320 | B1 | 6/2004 | Mitsuishi | |
| 7,231,509 | B2 * | 6/2007 | Gheith et al. .................. | 712/208 |
| 7,340,589 | B2 * | 3/2008 | Kudo .............................. | 712/213 |
| 7,373,483 | B2 * | 5/2008 | Henry et al. ................... | 712/210 |
| 2004/0039897 | A1 | 2/2004 | Kudo | |
| 2004/0250231 | A1 | 12/2004 | Killian et al. | |
| 2005/0216704 | A1 | 9/2005 | Ferrand et al. | |

FOREIGN PATENT DOCUMENTS

| | | |
|---|---|---|
| EP | 0 489 266 A2 | 6/1992 |
| JP | 4172533 | 6/1992 |
| JP | 2001-202243 | 7/2001 |
| JP | 2003-518280 | 6/2003 |
| JP | 2004030015 | 1/2004 |
| JP | 2005-353105 | 12/2005 |
| JP | 2006-284962 | 10/2006 |
| JP | 2006-313561 | 11/2006 |
| JP | 2007-250010 | 9/2007 |
| WO | 80/01423 | 7/1980 |
| WO | WO 00/46704 A3 | 8/2000 |

OTHER PUBLICATIONS

European Office Action dated Jul. 14, 2009 and issued in related European Patent Application 08171647.4.
Notification of Reasons for Refusal issued Jun. 5, 2012 in corresponding Japanese Patent Application No. 2007-341387 (6 pages) (3 pages English Translation).

* cited by examiner

*Primary Examiner* — Kenneth Kim
(74) *Attorney, Agent, or Firm* — Staas & Halsey LLP

(57) ABSTRACT

A processing unit has an extended register to which instruction extension information indicating an extension of an instruction can be set. An operation unit that, when instruction extension information is set to the extended register, executes a subsequent instruction following a first instruction for writing the instruction extension information into the extended register, extends the subsequent instruction based on the instruction extension information.

12 Claims, 23 Drawing Sheets

FIG. 7

| OPCODE [4:0] | COMB = 0 | F_SIMD | F_RD[7:5] | F_RS1[7:5] | F_RS2[7:5] | F_RS3[7:5] | SUBSEQUENT VALUES ARE INDEFINITE |

SXAR1

OP[1:0]=0, OP2[3:0]=7 operand

FIG. 12

PROCESSING
EXTEND FMADD
DO NOT EXTEND LDDF

→

INSTRUCTION
(3 INSTRUCTIONS)
SXAR2
FMADD
LDDF

| PROGRAM | OPERATION BY INSTRUCTION |
|---|---|
| 2 INSTRUCTIONS EXTENSION INSTRUCTION [SXAR2 INSTRUCTION] | WRITE EXTENSION INFORMATION INTO EACH OF F AND S AREAS |
| EXTENDED INSTRUCTION (FIRST INSTRUCTION) [FMADD INSTRUCTION] | EXECUTE EXTENDED FMADD INSTRUCTION BY REFERENCING EXTENSION INFORMATION IN F AREA RESET EXTENSION INFORMATION IN F AREA WHEN COMPLETED |
| EXTENDED INSTRUCTION (SECOND INSTRUCTION) [LDDF INSTRUCTION] | EXECUTE EXTENDED LDDF INSTRUCTION BY REFERENCING EXTENSION INFORMATION IN S AREA RESET EXTENSION INFORMATION IN S AREA WHEN COMPLETED |

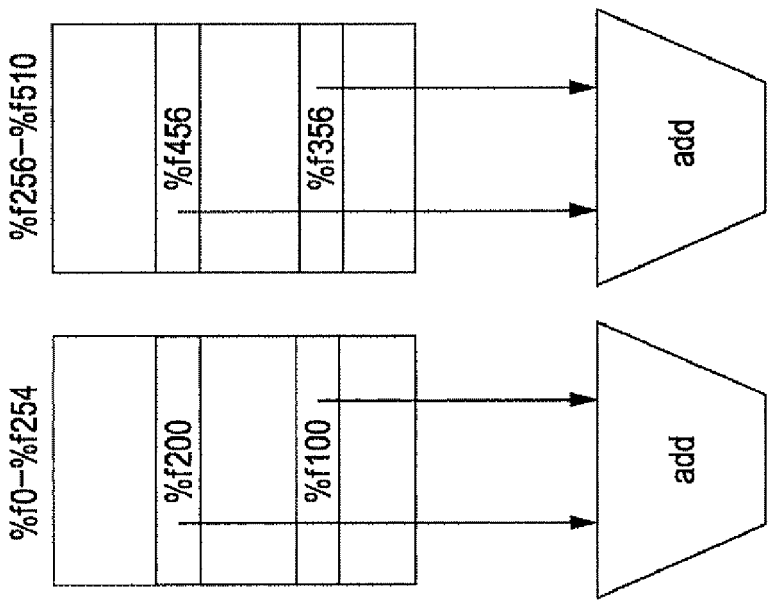
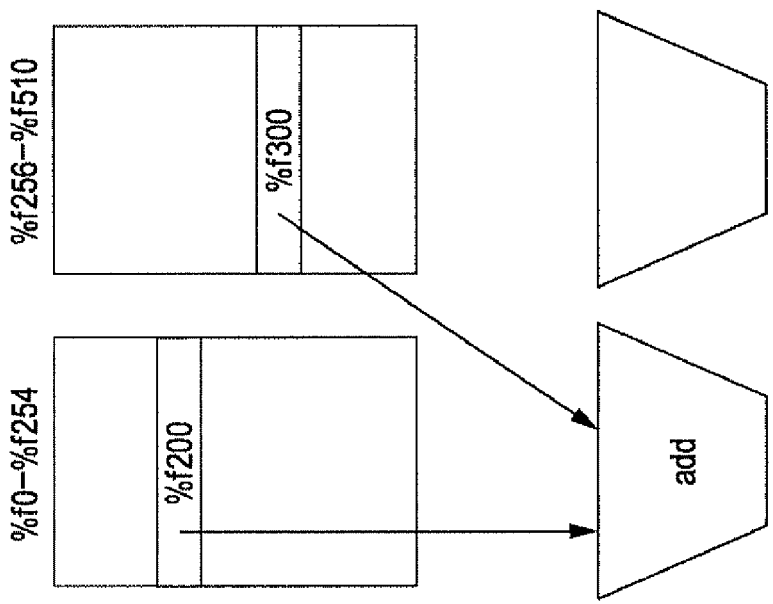

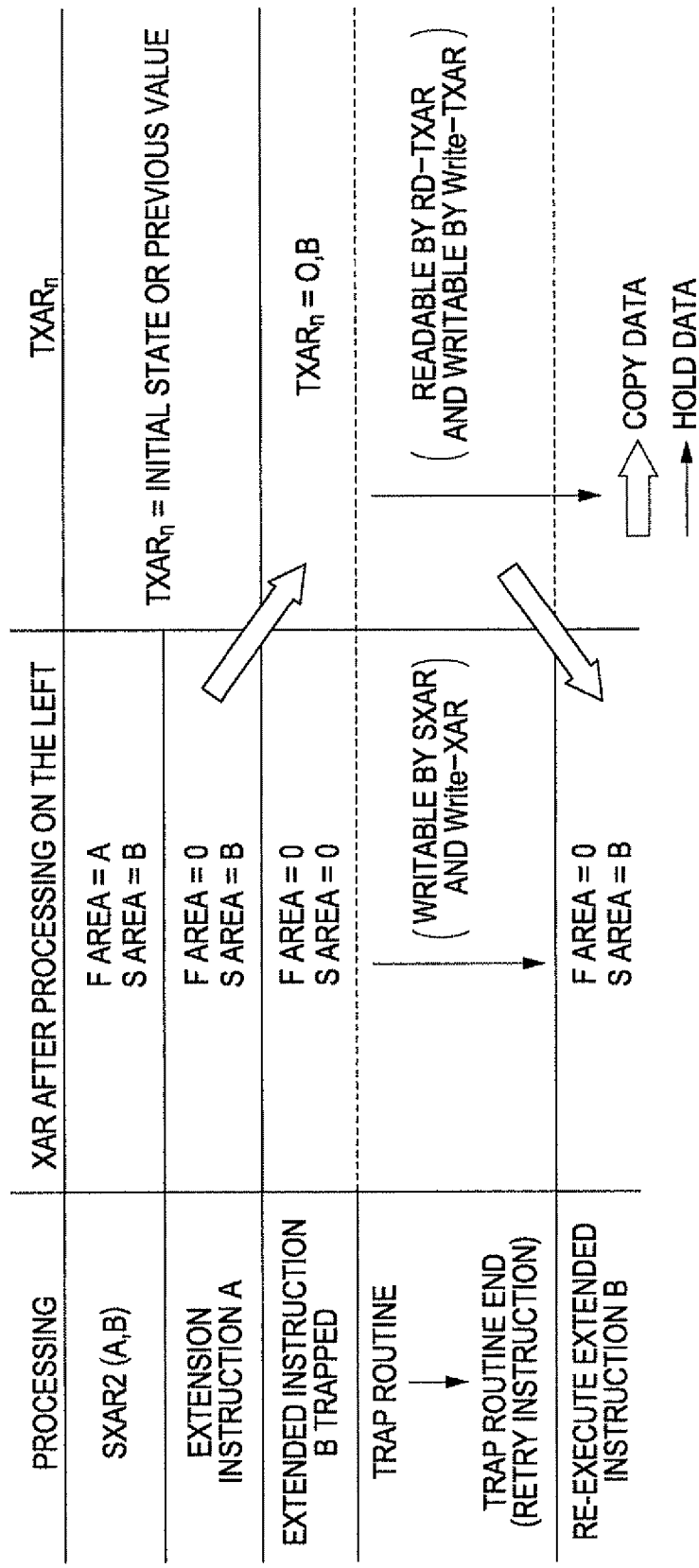

FIG. 18

| 00 | XGD | XFD[7:0] |
|---|---|---|
| 31  9 | 8 7 | 0 |

FIG. 22

SOFTWARE TRAP INSTRUCTION (EXAMPLE Ta rs1 + rs2)
ADDITION RESULT OF DATA OF REGISTER ADDRESSES rs1 AND rs2 DETERMINES TRAP TYPE (TRAP ADDRESS)

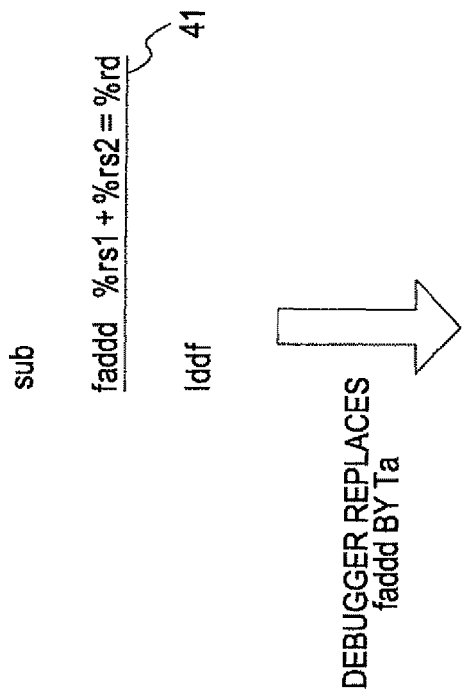

DEBUGGER REPLACES faddd BY Ta

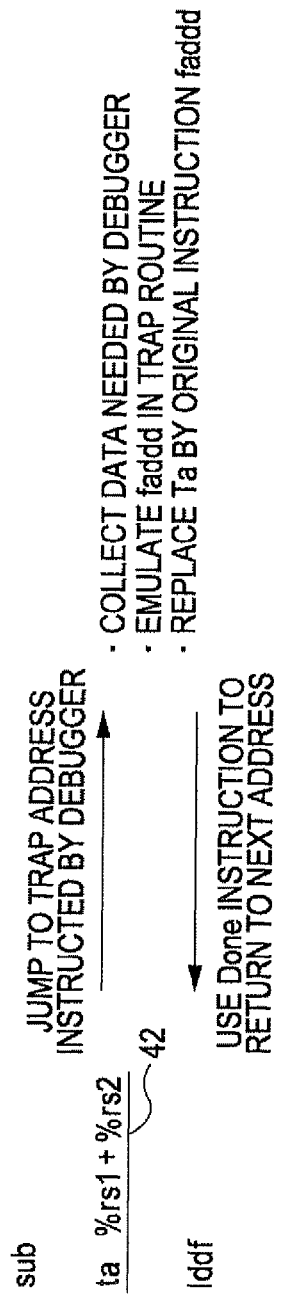

- COLLECT DATA NEEDED BY DEBUGGER
- EMULATE faddd IN TRAP ROUTINE
- REPLACE Ta BY ORIGINAL INSTRUCTION faddd

JUMP TO TRAP ADDRESS INSTRUCTED BY DEBUGGER

USE Done INSTRUCTION TO RETURN TO NEXT ADDRESS

PROCESSOR DECODING EXTENSION INSTRUCTION TO STORE PLURAL ADDRESS EXTENSION INFORMATION IN EXTENSION REGISTER FOR PLURAL SUBSEQUENT INSTRUCTIONS

CROSS-REFERENCE TO RELATED APPLICATIONS

This application is based upon and claims the benefit of priority of the prior Japanese Patent Application No. 2007-341387, filed on Dec. 28, 2007, the entire contents of which are incorporated herein by reference.

BACKGROUND

1. Field

An aspect of the present invention relates to a processing unit.

2. Description of the Related Art

In a numerical calculation program handling floating-point arithmetic, an increase of the number of registers within a processing unit enables optimization by a compiler such as loop unrolling and software pipelining so that performance can be improved.

On the other hand, in a processing unit of a RISC instruction set architecture, or a SPARC architecture for example, a limitation is imposed to fix the instruction length to 32 bits for example, and also a single process is instructed by a single instruction so that information held by one instruction is limited.

Under such limitations, various proposals of new instructions and to increase the number of registers have been made.

According to Patent Document 1 and Patent Document 2, register designation information designating a register is divided into two portions. Then, the two portions are arranged on separate basic units of instruction code and one instruction code is made omissible. If an omissible instruction code is omitted, a register selection operation is performed by implicitly assuming predetermined register designation information.

According to Patent Document 3 and Patent Document 4, instructions are extended by combining a plurality of instruction codes for transfer instructions between memory and register and operation instructions between registers to enable direct operations on data in a memory while maintaining compatibility with existing CPUs.

Further, according to Patent Document 5 and Patent Document 6, a user can add commands so that a processor can easily be redesigned.

[Patent Document 1] Japanese Patent Application Laid-Open No. 2001-202243
[Patent Document 2] Japanese Patent Application Laid-Open No. 2006-313561
[Patent Document 3] Japanese Patent Application Laid-Open No. 2005-353105
[Patent Document 4] Japanese Patent Application Laid-Open No. 2006-284962
[Patent Document 5] Japanese Patent Application Laid-Open No. 2003-518280
[Patent Document 6] Japanese Patent Application Laid-Open No. 2007-250010

Assuming that instructions have operation code length of 32 bits. For a PC (Program Counter) showing a logical address of an instruction performing processing and a logical address NPC (Next Program Counter) of an instruction to be executed next, logical specifications such as NPC=PC+4 are specified, as long as the instruction pointed to by the PC is not a branch instruction or a trap instruction. Thus, if the instruction length of one instruction is extended to 64 bits, existing software will not operate.

Under such limitations, in a floating-point sum-of-product arithmetic for which a total of four registers, three source registers and one destination register, must be designated, 4×8 bits=32 bits will be needed when 8-bit register addresses are designated. This means that 32 bits in a 32-bit instruction are used for designating the registers, so that information of operation code of the instruction type of sum-of-product arithmetic cannot be held at all. Therefore, 32-bit instructions with 8-bit register addresses cannot practically be defined.

As a conventional means of handling many registers under limitations of 32-bit length, an instruction set architecture adopting the register window system is known.

Taking the SPARC architecture as an example, a pointer called CWP (Current Window Pointer) is set by a separate instruction and subsequent instructions reference registers in a window pointed to by the CWP, for example, 32 5-bit registers that can be instructed by one operation code in a window.

Then, one register window is allocated to one sub-routine containing a plurality of instructions. When other windows are referenced or updated, the CWP is changed and then instructions are executed.

In this system, only processing within 32 registers can be performed by one instruction. Thus, processing using 32 registers or more at the same time cannot be performed and optimizations such as software pipelining and loop unrolling by a compiler cannot be performed so that performance improvement cannot be aimed for.

Being able to perform one piece of process with input of optional register data of, for example, 100 or 200 registers at the same time is effective in performance improvement by optimization of a compiler. That is, the number of registers handled in one piece of processing cannot be increased beyond a certain number due to limitations of the operation code length in the conventional RISC instruction set architecture and thus, performance improvement of floating-point programs cannot be expected, which has become a major subject.

Instructions of the type called SIMD (Single Instruction Multiple Data) instructions which perform a plurality of processings by one instruction are effective as floating-point instructions.

However, if SIMD instructions such as addition, multiplication, sum-of-product arithmetic, division, and square root arithmetic are newly added to the processing unit, as many instruction operation codes as the number of additional instructions must be allocated. For this purpose, empty operation codes not used for existing addition, multiplication, and sum-of-product arithmetic are found for allocation. Therefore, in an instruction set in which operation codes are allocated without originally assuming SIMD instructions, there may not be an empty field and even if there is an empty field, an SIMD instruction is allocated to an operation code that happens to be empty and thus, it is difficult to logically allocate SIMD instructions to operation codes in a well-ordered manner.

A high-performance processor in recent years has a cache memory inside the processor chip or near the processor. This is because a difference between the processing speed of memory and that of the processor has become large and data in the memory is controlled to be registered with the cache memory that can be accessed at high speed for reading and writing on the cache memory.

The cache memory has a set associative structure and cache registration/discharge is generally controlled by LRU (Least-Recently-USED) and thus, registered data may arbitrarily be discharged from the cache by hardware. In that case, data that may be reused is discharged when data that will not be reused is registered even if there is data that will not be reused depending on the circumstances, leading to performance degradation.

Regarding processing by an SIMD instruction handling a plurality of pieces of data by one instruction described above, for example, processing by an SIMD instruction handling two pieces of double precision floating-point data is generally realized by doubling the data width, that is, the number of bits of one register to 128 bits. However, not all programs can execute SIMD instructions and in that case, resources of the extended data width are wasted. Moreover, first half data and second half data in 128 bits cannot be handled separately, imposing restrictions on programming of software.

SUMMARY

According to an aspect of the present invention a processing unit is provided that is capable of extending instructions even if the operation code has a fixed length by defining new extension dedicated instructions and a method of extending instructions thereof.

Further, according to an aspect of the present invention a processing unit is provided that is capable of performing processing by combining existing instructions with one extension instruction and selecting input data for one operation from an extended register and an extension method of instructions thereof.

Further, according to an aspect of the present invention a processing unit is provided that is capable of defining instructions of SIMD instruction processing, such as addition, multiplication, and/or sum-of-product arithmetic, by defining a newly added extended dedicated instruction and combining the new instruction with addition, multiplication, sum-of-product arithmetic and/or the like defined in a conventional instruction set and an extension method of instructions thereof.

Also, according to an aspect of the present invention a processing unit is provided that is capable of instructing attributes of a cache way to be registered, for example, the way number from software, for each instruction when data is registered with the cache by a load instruction, store instruction, prefetch instruction or the like.

Also, according to an aspect of the present invention a processing unit is provided that is capable of effectively using all registers as different addresses in programs using no SIMD instructions and independently operating first half data and second half data in a register even in programs using SIMD instructions to improve availability of programming and an extension method of instructions thereof.

According to an aspect of the invention, a processing unit has an extended register to which instruction extension information indicating an extension of an instruction can be set; and an operation unit that, when instruction extension information is set to the extended register, executes a subsequent instruction following a first instruction for writing the instruction extension information into the extended register, by extending the subsequent instruction based on the instruction extension information.

Additional aspects and advantages of the invention will be set forth in part in the description which follows, and in part will be obvious from the description referencing the accompanying drawings forming a part hereof, wherein like numerals refer to like parts throughout, or may be learned by practice of the invention. The aspects and advantages of the invention will be realized and attained by the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 7 is a diagram showing an SXAR1 instruction field;

FIG. 12 is a diagram exemplifying an operation when SXAR2 instruction is executed;

FIG. 13 is a block diagram of computing units executing a non-SIMD instruction and an SIMD instruction;

FIG. 16 is a diagram exemplifying movement of the XAR register and the stack TXAR when a trap occurs during execution of an instruction extended by the SXAR2 instruction;

FIG. 18 is a diagram showing the configuration of an XASR register;

FIG. 22 is a diagram showing processing by a general debugger; and

DETAILED DESCRIPTION OF THE PREFERRED EMBODIMENTS

An embodiment of the present invention will be described below with reference to drawings.

A processing unit of the present embodiment described below is an example based on JPS1 (SPARC Joint Programming Specification), which is a logical specification based on the SPARC architecture. JPS1 has 32 double precision 64-bit floating-point registers. JPS1 also has a total of 32 fixed-point registers in the register window system, eight in registers, eight out registers, and eight local registers to be switched by the CWP, and eight global registers independent of CWP.

Incidentally, the processing unit of the present invention is not limited to SPARC architecture. The present invention may also be applicable to the RISC architecture in which the instruction length is fixed, for example.

Figure 1:
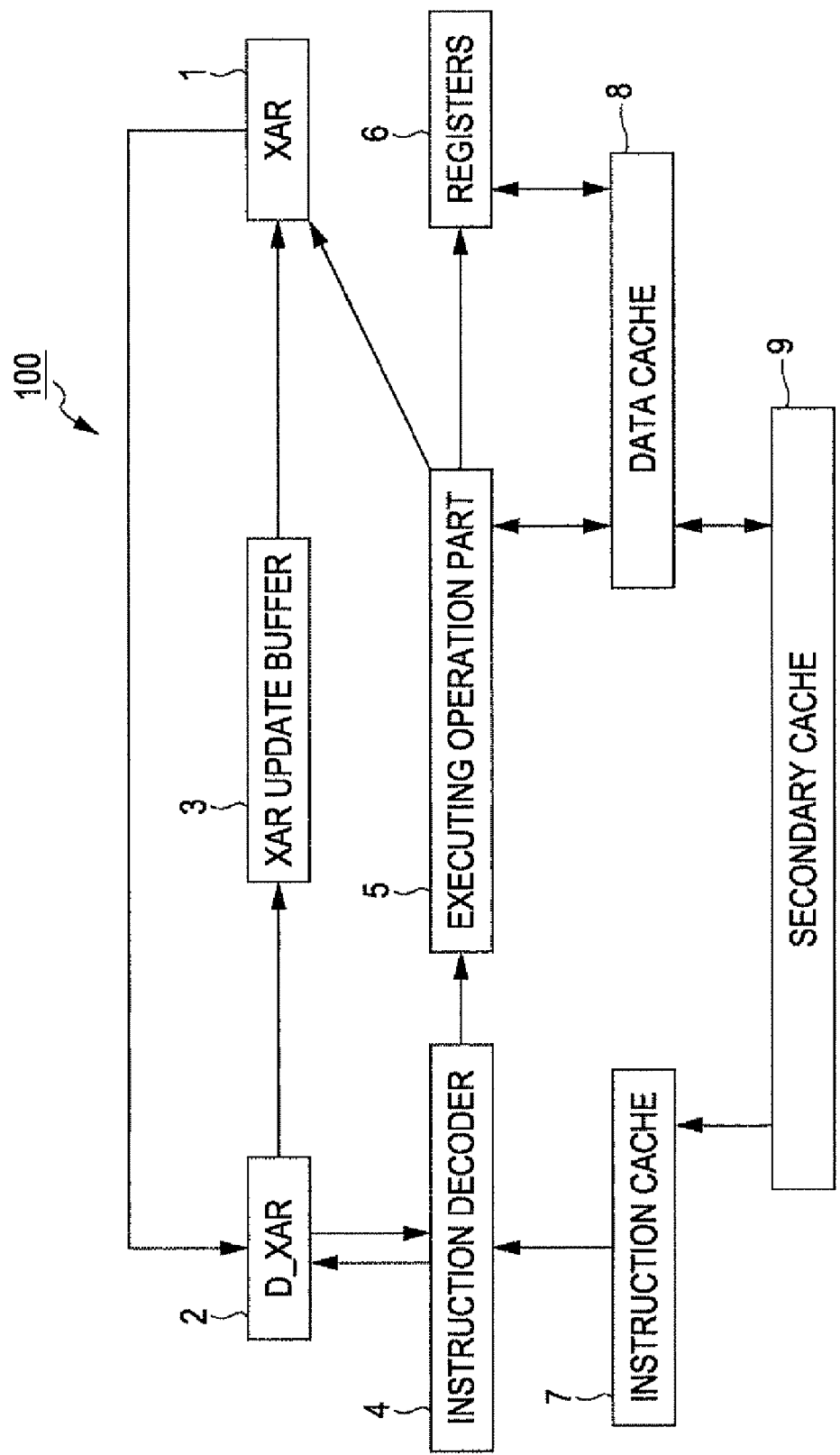
FIG. 1 is a diagram showing a processing unit of an embodiment of the present invention.

FIG. 1 is a diagram showing a processing unit according to the present embodiment. A processing unit 100 is provided with an extended arithmetic register 1 as a dedicated register for instruction extension. The extended arithmetic register is hereinafter referred to as "XAR register." Instruction extension information is stored in the XAR register 1.

The processing unit 100 extends an existing instruction to be executed after an instruction for storing data in XAR register 1, in accordance with content stored in XAR register 1. When an existing instruction is extended, extended registers other than the registers of JPS1 described above can be used, and SIMD instructions can be executed.

According to a method of the present embodiment, a length of an instruction has a fixed length, 32 bits in the case of JSP1, and therefore existing software and OS can be used unchanged.

Moreover, existing instructions can be extended by merely combining an instruction for writing information into XAR register 1 and existing instructions. Therefore, there is almost no limitation to the instruction operation code.

D_XAR register 2 is a temporary register for temporarily storing a value to be written into XAR register 1 when an SXAR instruction (SXAR; Set XAR) to rewrite content of XAR register 1 is executed. When an instruction following the SXAR instruction is decoded by an instruction decoder 4, the instruction decoder 4 references D_XAR register 2 as content of XAR register. Accordingly, SXAR instruction and the existing instruction following SXAR instruction can be decoded almost simultaneously. When registration processing fails or XAR register 1 is updated by Write-XAR instruction, data stored in XAR register 1 is written into D_XAR register 2. SXAR instruction and Write-XAR instruction will later be described in detail.

XAR update buffer 3 is a buffer to temporarily store data to be written into XAR register 1. The instruction decoder 4 reads instruction code from an instruction cache 7 to decode the instruction code. An executing operation part 5 executes an instruction based on a decoding result by the instruction decoder 4. Registers 6 are a group of registers from which data is read or to which data is written by the executing operation part. The registers 6 will later be described in detail. The instruction cache 7 is a primary cache memory caching instruction code from a secondary cache. A data cache 8 is a primary cache memory caching data code from a secondary cache. A secondary cache 9 is a secondary cache memory caching data from the memory.

Next, a configuration of the registers 6 will be described.

Figure 2:
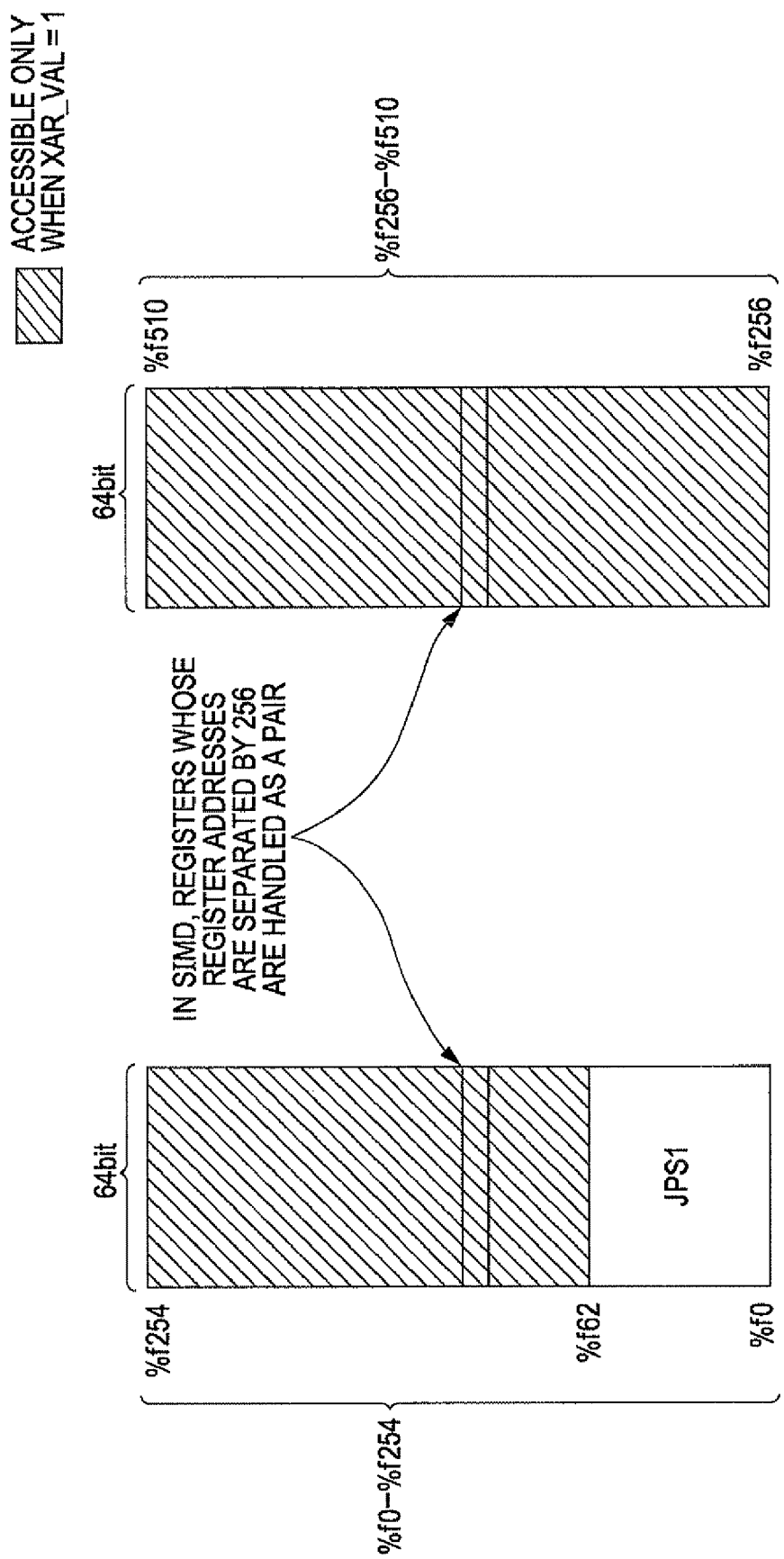
FIG. 2 is a diagram showing the configuration of floating-point registers of the processing unit.

FIG. 2 shows the configuration of floating-point registers of the processing unit 100 of the present embodiment. While JPS1 has 32 floating-point registers ranging from %f0 to %f62, floating-point registers in the processing unit 100 that stores data of 64-bit length are extended to 256 registers ranging from %f0 to %f510. In FIG. 2, diagonally shaded portions are extended portions of floating-point registers. If an instruction is not an SIMD instruction, operations can be performed among all 256 registers in FIG. 2.

Since JPS1 adopts a rule that an address of a double precision floating-point register should be designated by even numbers only, extended registers also obey the rule, and only even numbers from 0 to 510 are used to designate the register address. Moreover, only even numbers are used for register addresses of double precision floating-point registers and thus, the lowest-order bit of register address is always "0". Therefore, 0 to 510 can be designated by the 8-bit extended address. Incidentally, diagonally shaded extended registers in FIG. 2 can only be accessed when XAR_VAL=1.

Figure 3:
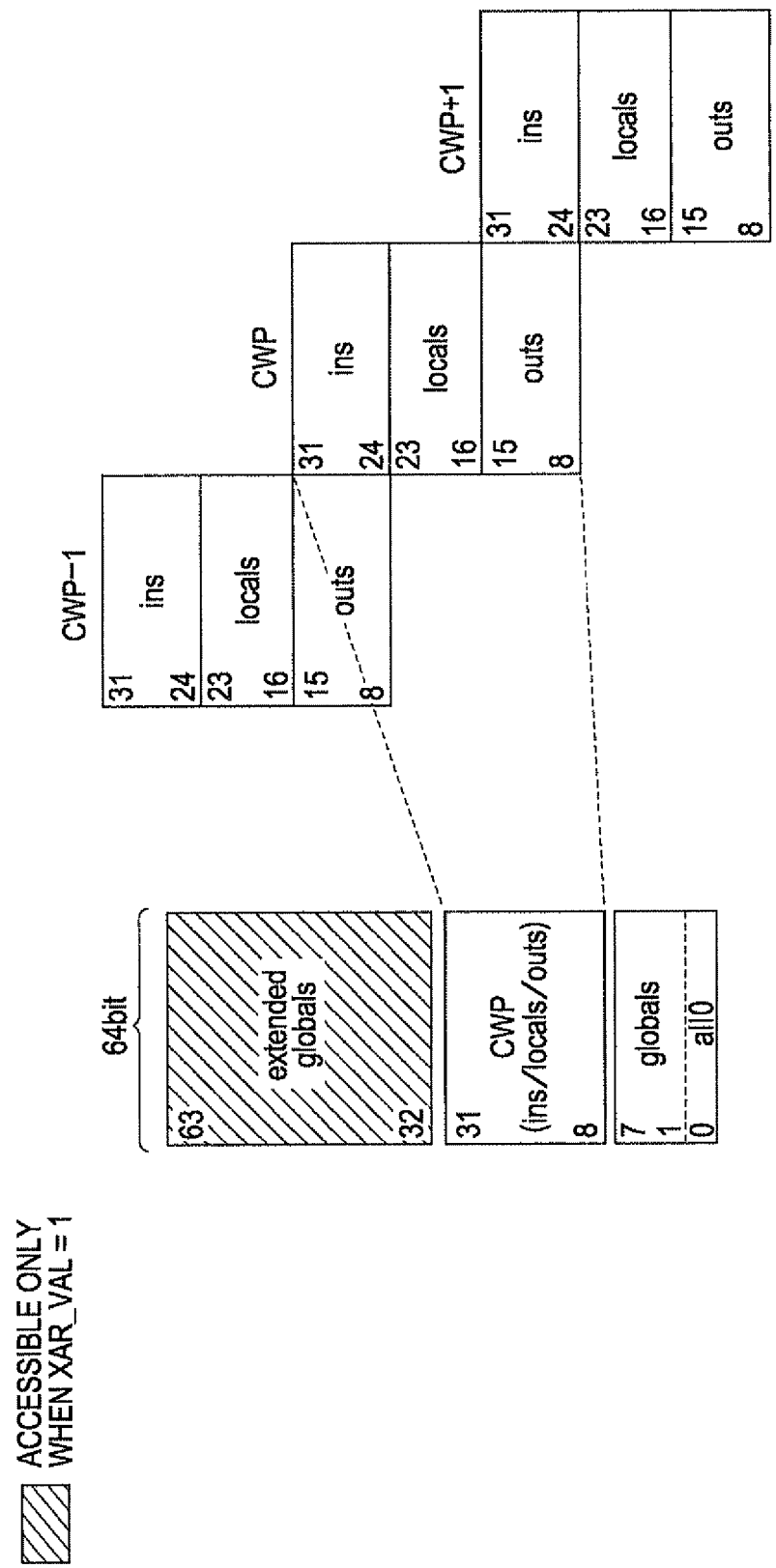
FIG. 3 is a diagram showing the configuration of a fixed-point register of the processing unit.

FIG. 3 shows a configuration of a fixed-point register of the processing unit 100 of the present embodiment. The processing unit 100 has a total of 32 fixed-point registers of 64-bit length data, eight global registers and 24 registers based on the CWP, that correspond to the conventional registers of JPS1. These registers are switched from CWP to CWP+1, or to CWP−1, when the window is switched. In addition, 32 XG (eXtended Global) registers independent of the CWP are added to the fixed-point registers of the processing unit 100, extending registers to a total of 64. In FIG. 3, a diagonally shaded portion is an extended portion of the fixed-point registers. The added registers do not adopt the window system.

To use registers in extended portions in FIGS. 2 and 3, the processing unit 100 executes an existing instruction defined by JPS1, such as double precision floating-point sum-of-product arithmetic FMADD, fixed-point addition ADD, or double precision floating-point load LDDF, while F_VAL bit or S_VAL of XAR register is set to a value "1". F_VAL bit=1 and S_VAL=1 will later be described in detail.

Figure 4:
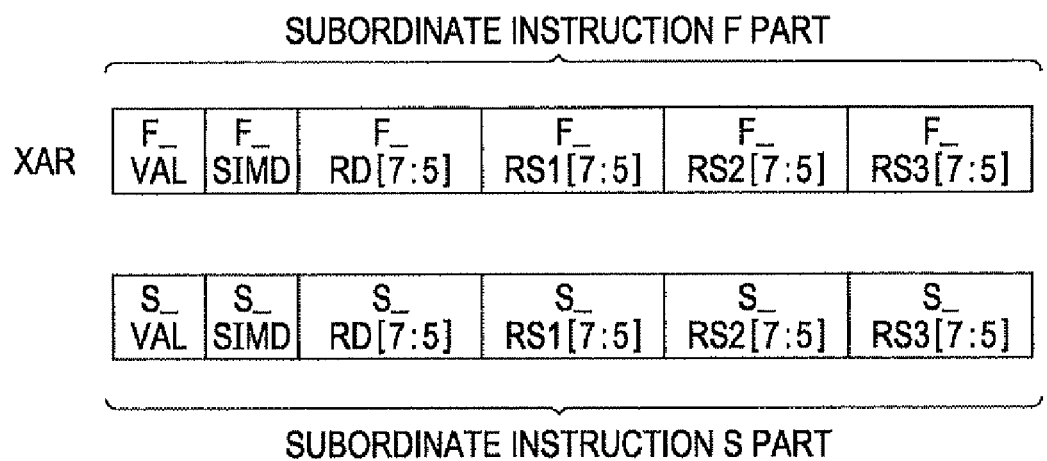
FIG. 4 is a diagram showing the configuration of an XAR register.

Next, an configuration of XAR register will be described. FIG. 4 is a diagram showing the configuration of XAR register. In FIG. 4, XAR register is roughly divided into a subordinate instruction F (First) part and a subordinate instruction S (Second) part. F part has F_VAL, F_SIMD, F_RD, F_RS1, F_RS2, and F_RS3 areas. Similarly, S part has S_VAL, S_SIMD, S_RD, S_RS1, S_RS2, and S_RS3 areas. F_VAL and S_VAL are 1-bit areas respectively, and show information indicating whether subsequent information is effectual, that means "valid".

When F_VAL=1, one instruction following immediately after instruction stored in XAR register is extended by the instruction extension information (F_SIMD, F_RD, F_RS1, F_RS2, and F_RS3) of the F part. When F_VAL=0 and S_VAL=1, one instruction following immediately after XAR instruction is extended by the instruction extension information (S_SIMD, S_RD, S_RS1, S_RS2, and S_RS3) of S part. When F_VAL=1 and S_VAL=1, two successive instructions immediately after XAR instruction are extended. The first instruction immediately after XAR instruction is extended by the instruction extension information indicated in F part, and the second instruction following the first instruction is extended by the instruction extension information indicated in S part.

Then, when an operation of writing the extended instruction to the registers 6 of the processing unit 100 is completed, that means "committed", the instruction extension information corresponding to the extended instruction and a valid bit thereof are reset. F_VAL is set to "1" when the instruction extension information of F part is written into the registers, and reset to "0" when an instruction is extended using the instruction extension information of F part. Similarly, S_VAL is set to "1" when the instruction extension information of S part is written into the registers, and reset to "0" when an instruction is extended using the instruction extension information of S part.

In descriptions that follow, an area of XAR register where the instruction extension information (F_SIMD, F_RD, F_RS1, F_RS2, and F_RS3) of F part is stored is called an F area, and an area of XAR register where the instruction extension information (S_SIMD, S_RD, S_RS1, S_RS2, and S_RS3) of S part is stored is called an S area.

F_SIMD and S_SIMD are 1-bit areas indicating whether an extended instruction is an SIMD instruction. When a value "1" is set to F_SIMD or S_SIMD, an instruction extended by the instruction extension information of F part or the instruction extension information of S part becomes an SIMD instruction. SIMD instructions according to a processing unit of the present embodiment will be described later.

F_RD and S_RD are areas for storing 3 bits of an extended portion of an address designating a destination register of the instruction to be extended. F_RS1 to F_RS3 and S_RS1 to S_RS3 are address extended areas each storing 3 bits of an extended portion of an address designating a source register.

These 3 bits become high-order 3 bits of an address lacking for existing instructions when the number of floating-point registers is extended to 256. When a fixed-point register is designated, only the lowest-order 1 bit of 3 bits is used. Then, if high-order 2 bits become "1" after designating the fixed-point register, a new exception illegal_action trap indicating an extension violation by XAR is caused when an extended instruction is executed. The new exception illegal_action trap also occurs when a third source register is designated for an addition instruction, multiplication instruction or the like.

Figure 5:
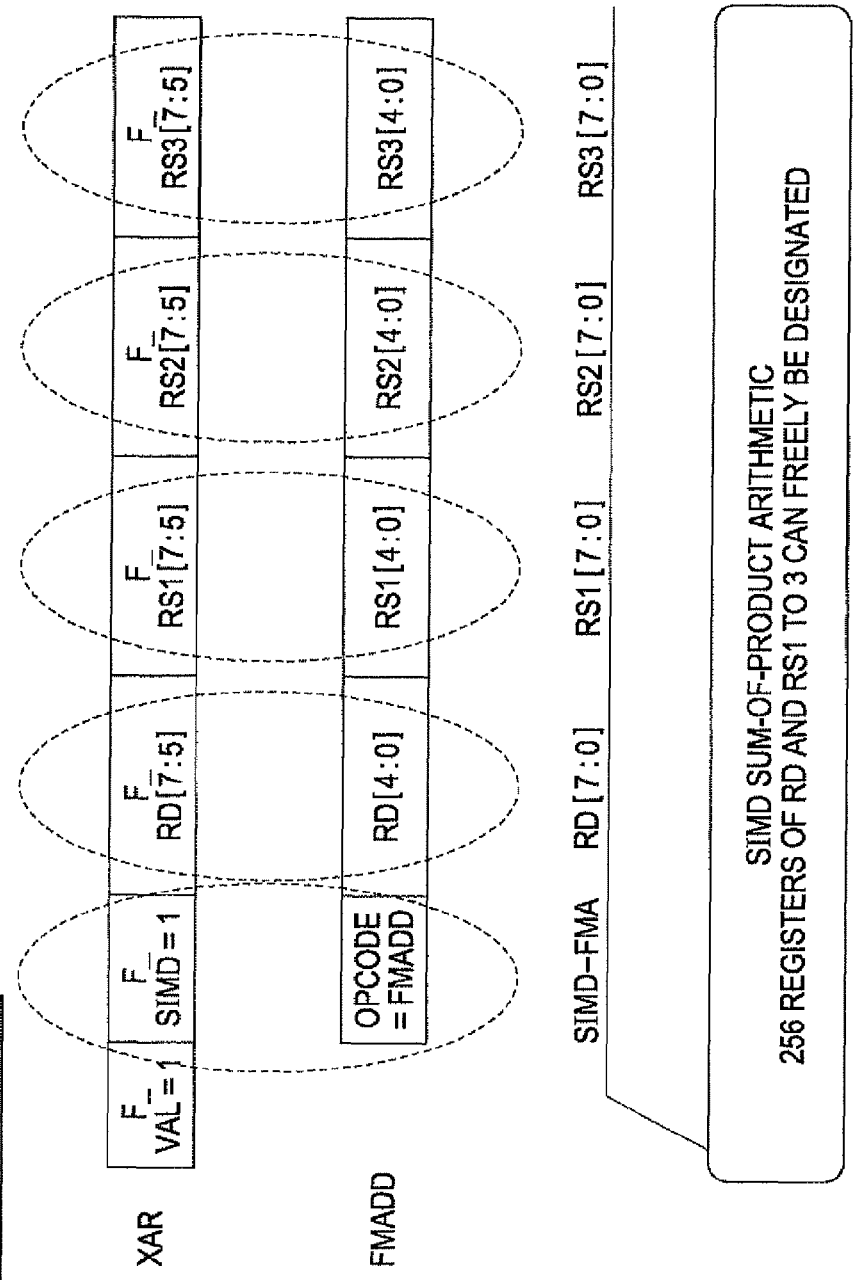
FIG. 5 is a diagram exemplifying instruction extension by the XAR register.

FIG. 5 exemplifies instruction extension by using XAR register. FIG. 5 is an example of extension of floating-point arithmetic. In FIG. 5, an example in which a double precision floating-point sum-of-product arithmetic instruction (FMADD) defined in JPS1 is executed as the next instruction after data is set to XAR register by SXAR instruction or the like is shown.

As shown in FIG. 5, three source registers and one destination register must be designated in FMADD instruction. The register designation address in FMADD instruction for the destination register designation has 5 bits of [4:0]. A total of 8 bits obtained by adding 3 bits of [7:5] of address extension area in XAR register to 5 bits is used to designate a source register. FMADD instruction extended by XAR register can designate 256 registers each as source registers and destination registers.

While it is necessary to designate three source registers and one destination register in FMADD instruction, designation of these numbers of registers may not be necessary depending on the type of instruction. For memory access of a double precision floating-point load instruction such as a load instruction, store instruction or prefetch instruction, there is no need to designate three source registers. The field in that case is used for the sector number indicating attributes of a cache way when data is registered with a cache.

Figure 6:
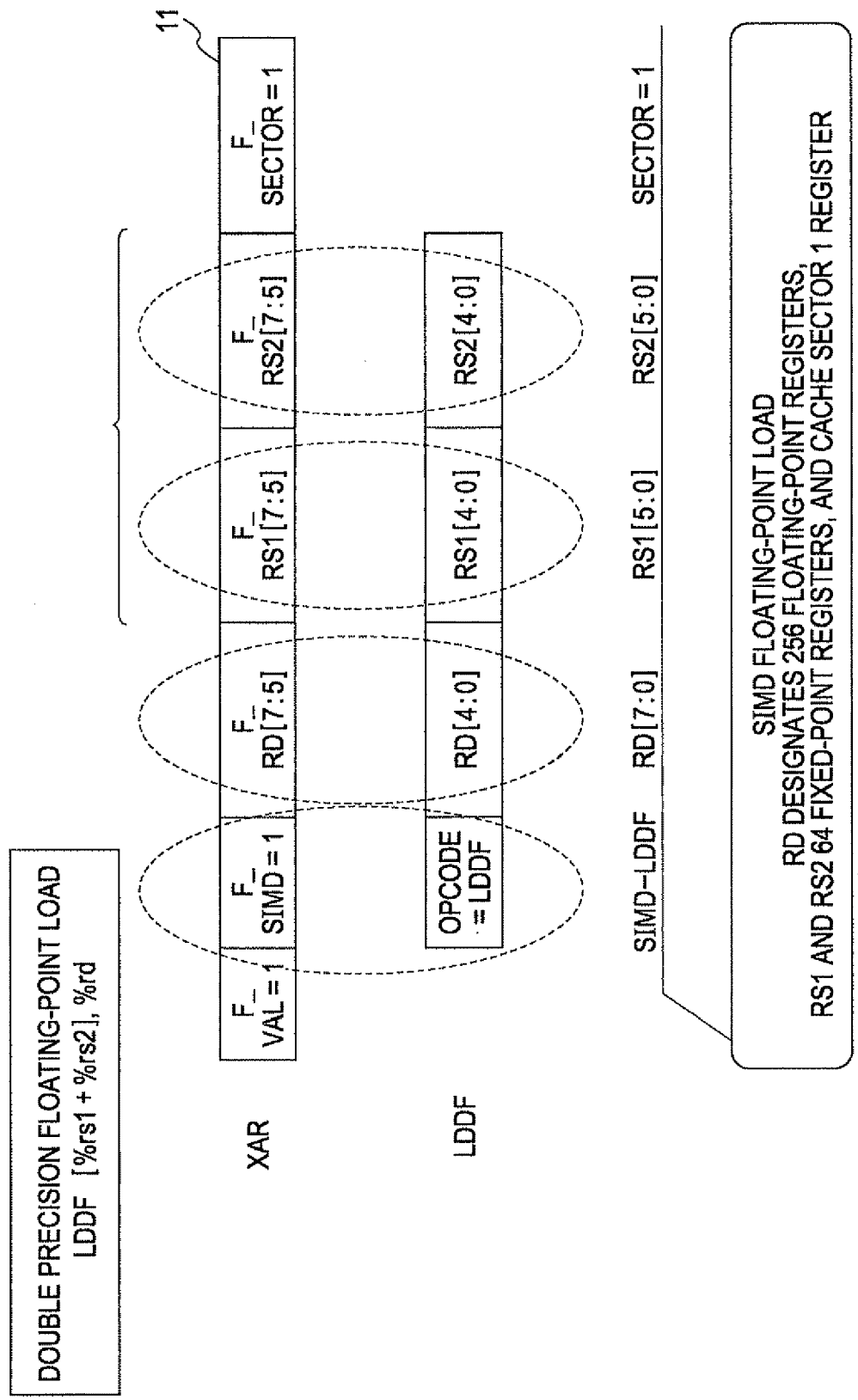
FIG. 6 is a diagram showing a case in which a double precision floating-point load instruction is executed as the next instruction after data being set to the XAR register.

FIG. 6 shows an example in which a double precision floating-point load instruction is executed. FIG. 6 shows a case in which double precision floating-point load (LDDF) instruction defined in JPS1 is executed as the next instruction after data being set to XAR register as an example.

As shown in FIG. 6, LDDF instruction only requires that two source registers and one destination register be designated. Thus, an area 11 of F_RS3 where the third source register is designated is empty.

In the present embodiment, the empty area 11 of XAR register is used to instruct the cache sector=1 as the sector number indicating attributes of the cache way when data is registered with a cache.

Next, SXAR instruction to rewrite the value of XAR register will be described. In the processing unit according to the present embodiment, SXAR instruction is one of instructions to update XAR register, and is defined as an instruction having update data in the instruction operation code in immediate form. Accordingly, hardware can speculatively determine content to be written into XAR when an instruction is decoded and thus, extension of the instruction to be decoded next can easily be implemented.

In SXAR instruction, information to be written into XAR register 1 in FIG. 1 is written into XAR register 1 via D_XAR register 2 and XAR update buffer 3. The instruction following SXAR instruction can know content of XAR register 1 by referencing D_XAR register 2 and thus, SXAR instruction and the instruction following SXAR instruction can be decoded almost simultaneously by the instruction decoder 4.

In addition to SXAR instruction, Write-XAR instruction that directly writes information into XAR register 1 without going through D_XAR register 2 or XAR update buffer 3 can be used as an instruction to rewrite XAR register. Decoding of Write-XAR instruction is not completed until data is directly written into XAR register 1, and decoding of the next instruction to be extended is not completed until Write-XAR instruction is completed. Write-XAR instruction will later be described in detail.

Two instructions, SXAR1 instruction and SXAR2 instruction, are defined as SXAR instruction. FIG. 7 shows SXAR1 instruction field. SXAR1 instruction is an instruction to extend single instruction following SXAR1 instruction. In FIG. 7, in the case of SXAR1 instruction, "OP [1:0]=0" and "OP2 [3:0]=7" which indicates SXAR instruction are set in an OPCODE [4:0] area indicating the type of instruction. Also in the case of SXAR1 instruction, "0" indicating SXAR1 instruction, is set to a COMB area that stores information showing whether an instruction is SXAR1 instruction or SXAR2 instruction. Further, information to be written into the instruction extension information of F part of XAR register is set to an operand area following COMB area. Values of areas following the operand area are indefinite in SXAR1 instruction. Area F_RS3 [7:5] designating the third source register becomes an area designating additional information for cache memory access such as the sector number when the instruction to be extended is a memory access instruction.

When SXAR1 instruction shown in FIG. 7 is executed, the operand value of SXAR1 instruction is set to F area of XAR register and value "1" is set to F_VAL. Then, the instruction executed immediately after SXAR1 instruction is extended based on the value of F area of XAR register. When the instruction executed immediately after SXAR1 instruction is completed, F area of XAR register is cleared and F_VAL is reset to "0".

Figure 8:
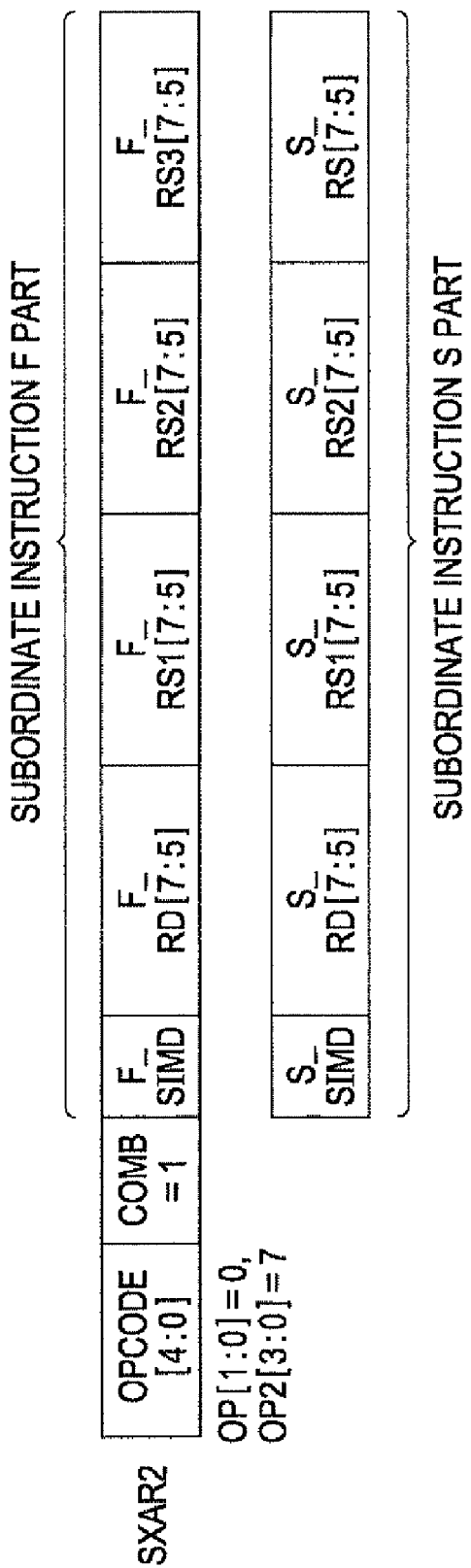
FIG. 8 is a diagram showing an SXAR2 instruction field.

Next, SXAR2 instruction will be described. SXAR2 instruction extends two instructions following SXAR2 instruction by setting values of XAR register. FIG. 8 shows SXAR2 instruction field. In FIG. 8, in the case of SXAR 2 instruction, like SXAR1 instruction shown in FIG. 7, "OP [1:0]=0" and "OP2 [3:0]=7" shows SXAR instruction are set in OPCODE [4:0] area indicating the type of instruction. Also, a value "1" indicating SXAR2 instruction is set to COMB area indicating whether an instruction is SXAR1 instruction or SXAR2 instruction. The operand area following COMB area includes a subordinate instruction F part and a subordinate instruction S part. Information to be written into F area of XAR register is set inside the subordinate instruction F part, and information to be written into S area of XAR register is set inside the subordinate instruction S part. Areas F_RS3 [7:5] and S_RS3 [7:5] that are used to designate the third source register become areas to designate additional information for cache memory access when the extended instruction is a memory access instruction.

When SXAR2 instruction in FIG. 8 is executed, values are set to F area and S area of XAR register and a value "1" is set to F_VAL and S_VAL. Then, like SXAR1 instruction, the first instruction executed after SXAR2 instruction is extended based on the value of F area of XAR register. When an execution of the first instruction is completed, F area of XAR register is cleared and F_VAL is reset to "0". Then, the second instruction to be executed next to the first instruction is extended based on the value of S area of XAR register. When an execution of the second instruction is completed, S area of XAR register is cleared and S_VAL is reset to "0".

By using SXAR2 instruction as described above, two instructions following immediately after SXAR2 instruction can be extended. Therefore, when extension instructions continue, SXAR2 instruction can realize more code-efficient programming than SXAR1 instruction.

Figure 9:
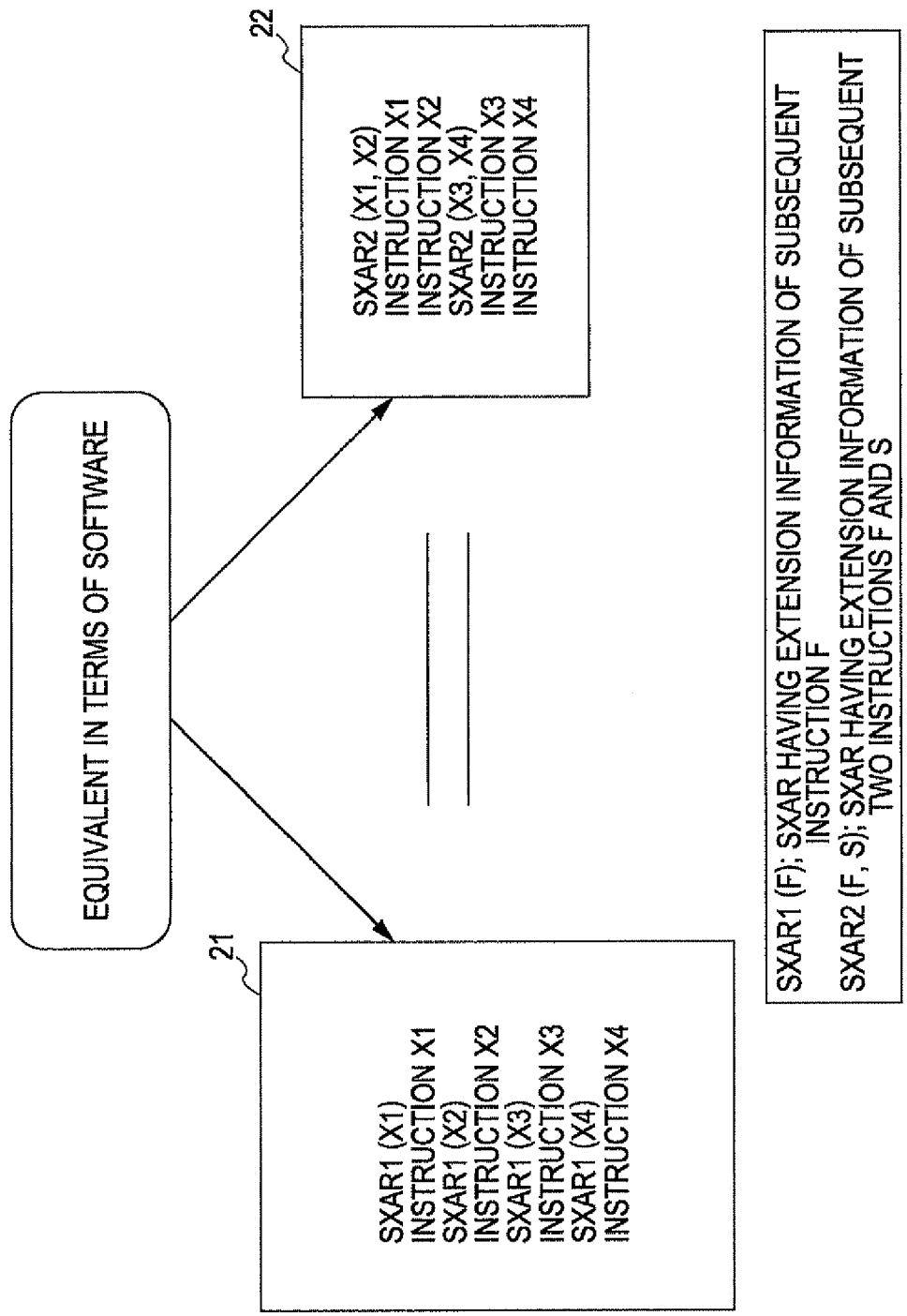
FIG. 9 is a diagram exemplifying instruction generation using an SXAR2 instruction.

FIG. 9 is a diagram exemplifying instruction generation using SXAR2 instruction. In FIG. 9, a program 21 is code-generated without using SXAR2 instruction. In contrast, a program 22, which is equivalent to the program 21 in terms of software, is code-generated by using SXAR2 instruction.

Comparison of both programs shows that the program 22 generated by using SXAR2 instruction is more code-efficient with a smaller number of instructions comparing to the program 21. Thus, the way of code generation of the program 22 that can reduce the number of instructions is recommended for a compiler.

In a processing unit of the present embodiment, as described above, XAR register is provided and an instruction can be extended by storing instruction extension information in XAR register.

An example of a method of executing such instruction extension is a mode switching method. In the mode switching method, a register for switching a mode to the extension instruction execution mode is defined and, when an extension instruction should be executed, the mode switching register is rewritten to switch to the extension instruction execution mode.

When such a mode switching method is used, the method is effective if extension operations of instructions by the mode are regularly used. However, if extension instructions and instructions not subject to extension are mixed, entering the extension instruction execution mode and returning to the normal mode from the extension instruction execution mode must be repeated. Thus, each time the mode is switched, an instruction to rewrite the mode switching register may be executed.

When switching to a state that specifically limits the 32-bit address space instead of the 64-bit space, for example, a logical specification to designate the address space by a mode bit system such as a processor state register has been known. The mode bit retains the state thereof after an instruction to set the bit is executed until an instruction to reset the bit is executed.

When a 32-bit mode is set, a whole program is described in 32-bit mode and. Therefore, there is no need to switch to 64-bit space frequently for each instruction and thus, such a mode designation is sufficient.

However, when extended register addresses or SIMD instructions are used like in a processing unit of the present embodiment, instructions to be extended and instructions not to be extended are frequently mixed. Therefore, if a program that is fully switched for each instruction is executed, the number of instructions is further increased if it is necessary to execute an instruction to reset a mode, in addition to an instruction to set like a mode setting. Thus, in a processing unit of the present embodiment, extension information is defined so that after being set to the XAR register, the extension information is reset simultaneously with execution of an extended instruction. This makes insertion of an instruction to reset instruction extension unnecessary.

Figure 10:
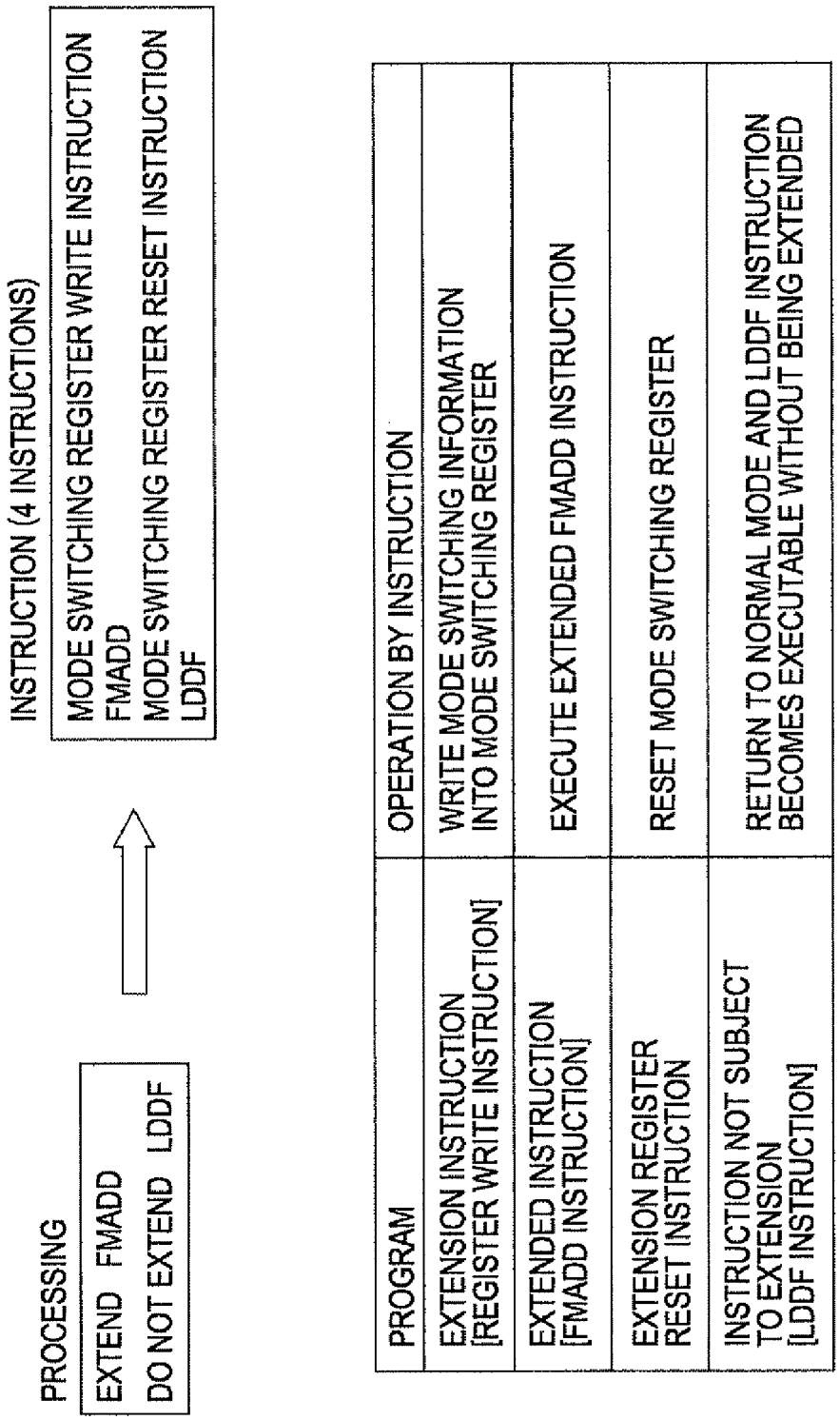
FIG. 10 is a diagram exemplifying mode switching to use an extension instruction.

FIG. 10 is a diagram exemplifying mode switching to use an extension instruction. FIG. 10 shows a case of process in which FMADD instruction is executed as an extended instruction and then, LDDF instruction is executed as an instruction not subject to extension. In FIG. 10, a mode switching register write instruction is executed before executing FMADD instruction, and a mode switching register reset instruction is executed before executing LDDF instruction to return to the normal mode.

Therefore, in the example in FIG. 10, a total of four instructions are needed to execute the extended FMADD instruction and the non-extended LDDF instruction. In contrast, in the extension method of an instruction performed by the processing unit in the present embodiment, when an extension instruction is executed, the corresponding information stored in XAR register is automatically reset. Accordingly, even if instructions to be extended and those not to be extended are mixed, there is no need to reset XAR register, increasing code efficiency correspondingly.

Figure 11:
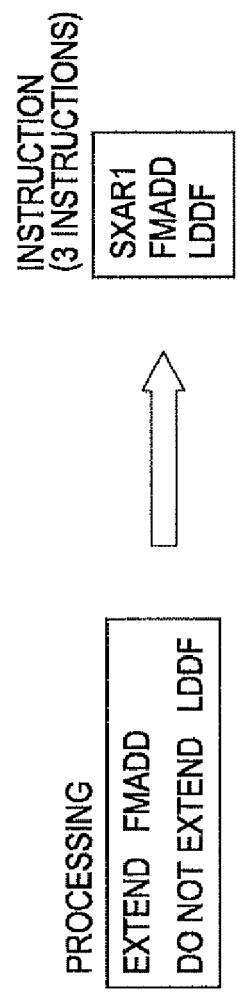
FIG. 11 is a diagram showing a case in which the same processing as that in FIG. 10 is performed by the processing unit of the present embodiment.

FIG. 11 is a diagram showing a case in which the same processing as that in FIG. 10 is performed by the processing unit in the present embodiment. In FIG. 11, SXAR1 instruction is executed before FMADD instruction which is an extended instruction, to write information for instruction extension into XAR register. Then, when FMADD instruction is executed as an extension instruction, the information for instruction extension in XAR register is reset. Therefore, LDDF instruction to be executed next to FMADD instruction is executed without extending an instruction because there is no information for instruction extension in XAR register.

Thus, if FMADD instruction to be extended and LDDF instruction not to be extended are executed in a processing unit, only three instructions are required. Therefore, in this case, the same processing can be realized by a program which is more code-effective than a processing unit whose mode is switched.

Next, details of operation when SXAR2 instruction is executed will be exemplified. FIG. 12 is a diagram exemplifying the operation when SXAR2 instruction is executed. FIG. 12 shows a case in which FMADD instruction and the subsequent LDDF instruction are executed by extending these instructions. In the case shown in FIG. 12, instructions to be executed are three instructions, namely SXAR2 instruction, FMADD instruction, and LDDF instruction.

After SXAR2 instruction is executed, extension information used for instruction extension is written into F area and S area of XAR register. In addition, a value "1" is set to F_VAL and S_VAL.

Next, FMADD instruction which is the first extended instruction is executed by referencing F area of XAR register as an extended FMADD instruction. Then, after executing FMADD instruction, F_VAL and F area of XAR register are reset.

Next, LDDF instruction, which is the second extended instruction to be executed next to FMADD instruction, is executed by referencing S area of XAR register as an extended LDDF instruction. Then, after executing LDDF instruction, S_VAL and S area of XAR register are reset.

Thus, when SXAR2 instruction is executed, F area and F_VAL are reset after executing the first extended instruction and then, the second extended instruction is executed. Each time one of two extended instructions in which S area and F_VAL are reset is executed, the corresponding area in XAR register is reset.

Since the corresponding area in XAR register is reset each time each instruction is completed as described above, two subsequent instructions can be extended by SXAR2 instruction, and also code efficiency does not drop even if instructions to be extended and instructions not to be extended are mixed.

Moreover, the corresponding area in XAR register is reset each time each instruction is completed and therefore, no problem arises even if an interrupt described later occurs between the first and second instructions.

Next, SIMD instructions will be described. In the processing unit according to the present embodiment, SIMD instruction for performing a plurality of pieces of processing by single instruction is defined as an extension instruction. In the configuration of XAR register shown in FIG. 4, F_SIMD bit is a bit to designate whether to extend the first instruction subsequent to an XAR instruction as SIMD instruction. If F_SIMD=1 is set, the first instruction is extended as SIMD instruction. Similarly, S_SIMD bit is a bit to designate whether to extend the second instruction as SIMD instruction. If S_SIMD=1 is set, the second instruction after the first instruction subsequent to the XAR register is extended as SIMD instruction. In the case of SIMD instruction, if one floating-point register is designated as a source register or destination register in F area or S area, two floating-point registers are designated.

As shown in FIG. 2, extended SIMD instruction handles two registers whose register addresses are separated by 256 as a pair. SIMD instruction performing SIMD processing that processes two pieces of data in parallel, when specified to designate the highest-order bit of the extended register address by "0", with a floating-point register whose highest-order bit is "0" and that whose highest-order bit is "1" as a set.

For example, if faddd % f0, % f100, % f200 is executed as SIMD instruction, an operation of % f256+% f356=% f456 is performed simultaneously with that of % f0+% f100=% f200.

Accordingly, all floating-point registers can be designated as different addresses for an extension instruction, which is not SIMD instruction, in the processing unit according to the present embodiment. Moreover, if SIMD processing can be performed, data processing can be achieved by single instruction at double speed by extending the instruction as SIMD instruction.

Since SIMD instruction is extended by holding F_SIMD bit and S_SIMD bit, which are extension bits indicating whether an instruction in the XAR register is SIMD instruction, SIMD instruction can be extended by merely combining an instruction written into XAR register and an existing instruction so that limitations on instruction operation code can be minimized.

FIG. 13 is a block diagram of computing units executing a non-SIMD instruction and SIMD instruction. FIG. 13A shows the configuration of a non-SIMD instruction and FIG. 13B shows the configuration of SIMD instruction. When % f200+% f300 is executed by a non-SIMD instruction as shown in FIG. 13A, only addition of data in the % f200 register and the % f300 register is performed using single adding unit. In contrast, when % f100+% f200 is executed by SIMD instruction as shown in FIG. 13B, in addition to addition of data in the % f100 register and the % f200 register, addition of data stored in % f356 register and % f456 register having addresses obtained by adding 256 to % f100 and % f200 respectively, that is, addresses whose highest-order bit is changed from "0" to "1", is simultaneously performed using two adding units.

While SIMD instruction can designate only 128 registers of register addresses % f0 to % f254, a non-SIMD instruction can designate any register addresses % f0 to % f510 as a source register or destination register. Moreover, each register can be independently operated even after SIMD instruction is executed.

Next, interrupt process in the processing unit according to the present embodiment will be described. In the present embodiment, instructions are extended by executing instructions in two groups separately. The first group is a group of instructions written into XAR register, that is, SXAR1 instruction, SXAR2 instruction, Write-XAR instruction and the like. The second group is a group of extended instructions.

Instructions that write extension information into XAR register such as SXAR1 instruction, SXAR2 instruction, and Write-XAR instruction, and extended instruction following immediately after these instructions are different instructions. Thus, a trap caused by an external interrupt may occur between a time when extension information is set to XAR and a time when an extended instruction is executed. In that case, when returning from the trap, process needs to be restarted by restoring a state before the trap occurred.

Thus, the processing unit according to the present embodiment is provided with a dedicated stack TXAR that temporarily saves information in XAR register when entering a trap. Stack TXAR can be accessed at high speed, and content in XAR register is read and written at high speed when entering a trap or returning from a trap.

Figure 14:
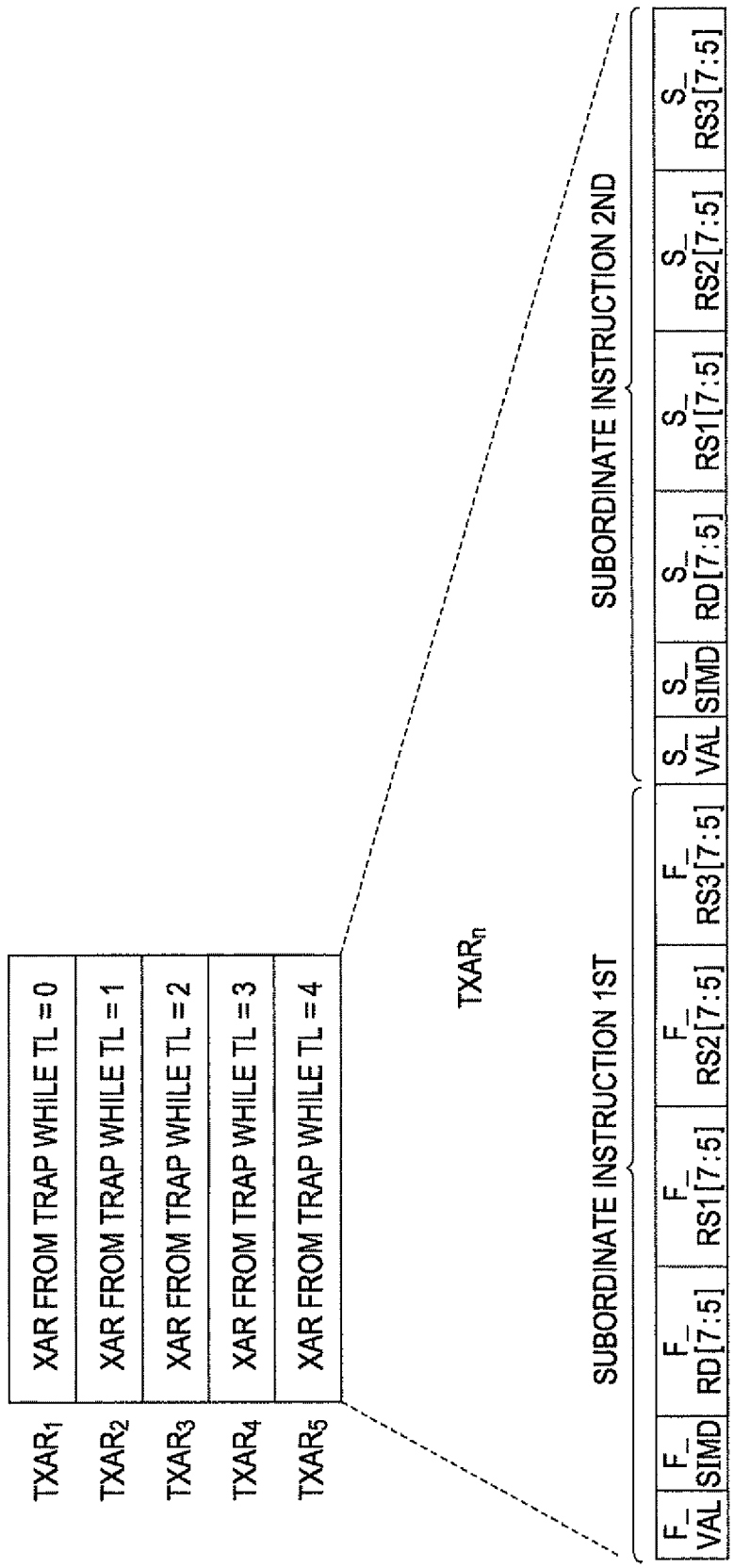
FIG. 14 is a diagram showing the configuration of TXAR.

FIG. 14 is a diagram showing the configuration of stack TXAR. Like other trap stacks defined in SPARC architecture, stack TXAR is provided to each trap level. Information of stack TXAR is intended to hold values of XAR register when entering a trap and has no influence on extension of conventional instructions like XAR register.

JPS1 defines up to five trap levels and TXAR is provided to each trap level as shown in FIG. 14. In FIG. 14, TXAR1 is constituted as TXAR to save content of XAR register when a trap occurs in a state of the trap level=0. Similarly, TXAR2 is constituted as TXAR to save content of XAR register when a trap occurs in a state of the trap level=1, . . . , and TXAR5 is constituted as TXAR to save content of XAR register when a trap occurs in a state of the trap level=4.

When a trap occurs, the processing unit saves content of XAR register in stack TXAR corresponding to the trap level before the trap occurred. At the same time, the processing unit clears data in XAR register so that instructions of a trap routine should not be extended by extension information in XAR register before entering the trap. When returning to the original processing from the trap after the trap routine being completed, if the trap level is lowered by one level by a done instruction or retry instruction in an example of JPS1, values are copied from stack TXAR corresponding to the trap level to XAR register.

Figure 15A:
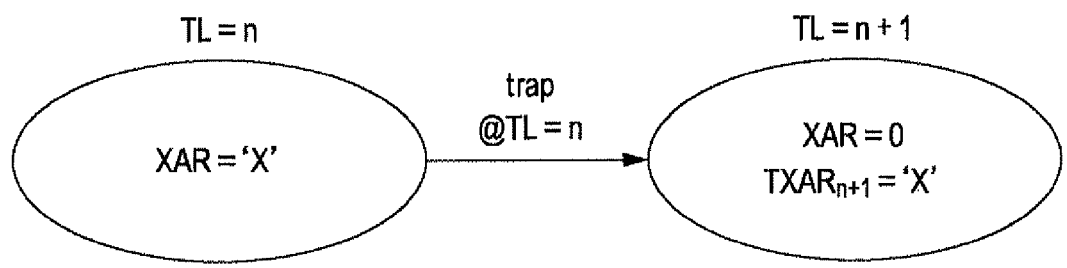
FIG. 15 is a diagram showing a relationship between a stack TXAR and the XAR register when a trap occurs.

FIG. 15 shows a relationship between stack TXAR and XAR register when a trap occurs. FIG. 15A shows movement of stack TXAR and XAR register when a trap is caused by a trap instruction. If content of XAR register before the trap occurs is "X" and the trap level goes up from n to n+1 after the trap occurs, the content "X" of XAR register is written into stack TXARn+1 and XAR register is cleared to "0".

Figure 15B:
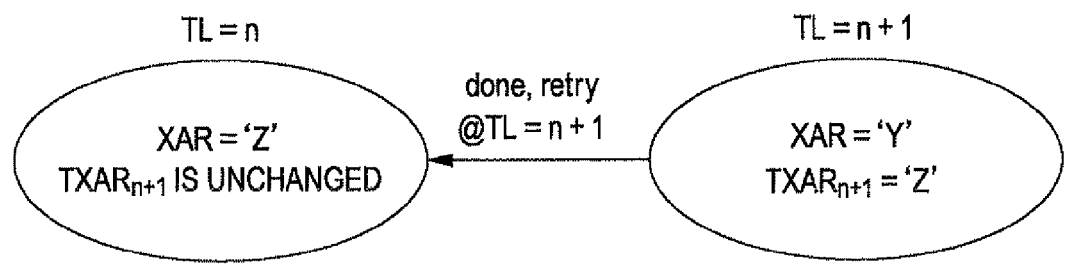

FIG. 15B shows movement of TXAR and XAR register when returned from the trap by the done instruction or the retry instruction. If content of XAR register is "Y" and the content of stack TXARn+1 is "Z" before returning from the trap and the trap level goes down from n+1 to n after returning from the trap, the content "Z" of stack TXARn+1 is copied to XAR register and content of stack TXARn+1 remains unchanged.

This configuration ensures that correct process is performed in the processing unit both when a trap occurs and returning from a trap.

Instruction such as RD-TXAR instruction that reads data in stack TXAR to a fixed-point register, or Wr-TXAR instruction that reads both a source register 1 and a source register 2 from the fixed-point register and calculates an exclusive OR (xor: exclusive or) of the source register 1 and the source register 2 and writes a result thereof into TXAR are defined. For stack TXAR of the current trap level, these defined instructions are used.

FIG. 16 is a diagram exemplifying movement of XAR register and stack TXAR when a trap occurs during execution of an instruction extended by SXAR2 instruction. In the example in FIG. 16, movement of XAR register and stack TXAR at the time when a trap occurs during execution of an extension instruction B in a program in which the trap level TL=n, and an instruction "A" and the instruction "B" that follow SXAR2 instruction are extended is shown. First, when SXAR2 (A, B) is executed, instruction extension information A is written into F area of XAR register, and instruction extension information "B" is written into S area.

Next, when an extended instruction "A" is executed, F_VAL and F area of XAR register are cleared to "0", and the instruction extension information "B" stored in S area is unchanged.

In the meantime, stack TXAR stores data written thereto in an initial state or when a trap occurred in the past stored therein. Next, if a trap occurs during execution of an extended instruction "B", values stored in XAR register are saved in stack TXARn, and XAR register is cleared. Therefore, values "0" and "b" that were stored in XAR register are written to stack TXARn, and all values of XAR register are "0".

Trap routine process is performed in the state mentioned above. The trap routine process is not affected by instruction extension information before a trap occurs. Moreover, data can be written into XAR register and data can be written into and read from stack TXAR.

When returned from the trap after the trap routine process is completed, data saved in stack TXAR is written into XAR register and the extended instruction B is re-executed. Then, a value "0" is written into F area of XAR register and the instruction extension information "B" is written into S area and therefore, the extended instruction "B" is extended in re-execution without being affected by the trap.

According to the foregoing, the processing unit according to the present embodiment can guarantee that process during a trap or a process that is processed when returning from a trap can correctly be performed.

Traps in the processing unit according to the present embodiment also include a trap that occurs when an erroneous non-definable instruction is decoded.

For extension information stored in the XAR register, such as register extended addresses and SIMD bits, it is determined whether a process corresponding to the extension information cannot be defined only after combining the extension information with an extended instruction immediately after the extension information.

For example, in the present embodiment, each register extended address field in XAR register has 3 bits. However, as the number of fixed-point registers is smaller than a number of floating-point registers, if an instruction to be extended is an instruction that designates fixed-point registers such as a fixed-point addition instruction ADD and designates the 256th register in the extended address field, an extension violating instruction will be designated.

The processing unit according to the present embodiment is provided with a definition so that in such case, an extension exception (illegal_action) trap is caused. The priority (trap-priority) of this trap is defined lower than that of a trap of undefined instruction (illegal_instruction) showing that the instruction is an erroneous non-definable instruction alone without combining with another instruction.

Figure 17:
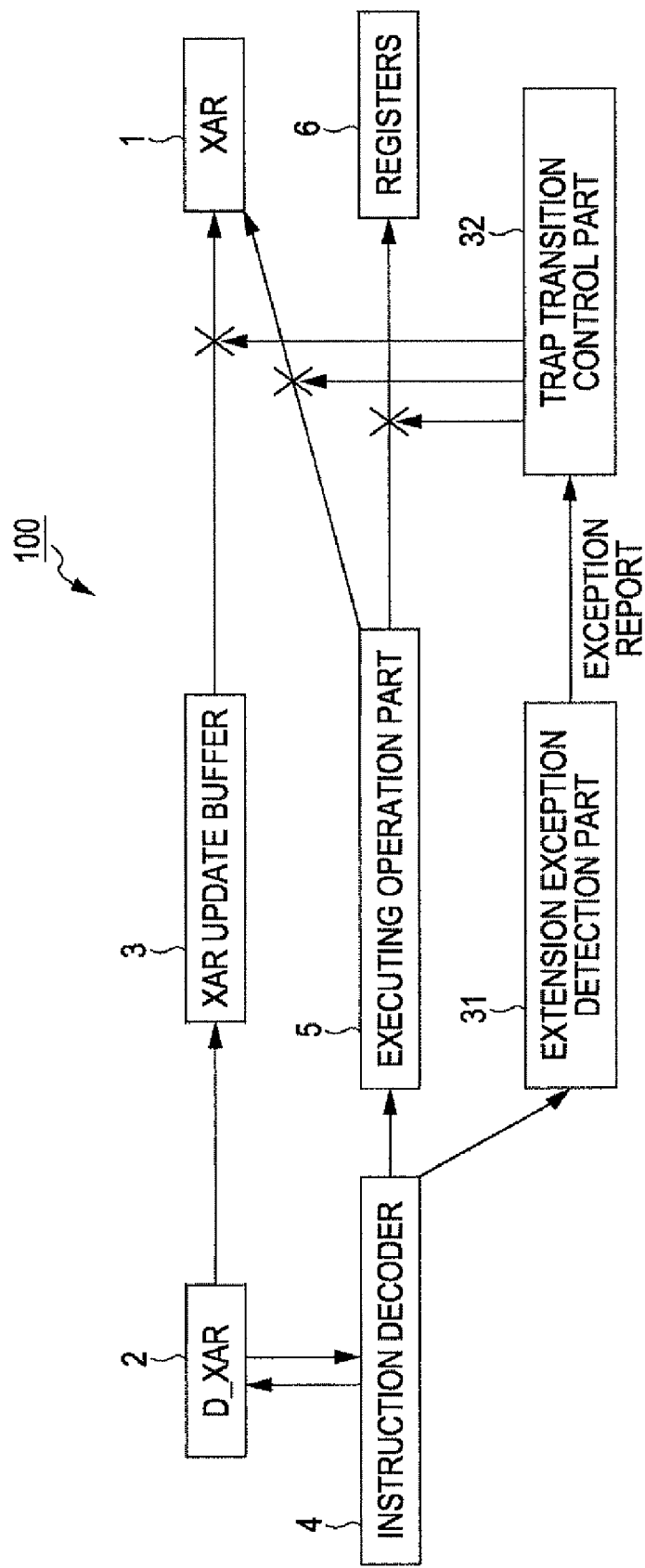
FIG. 17 is a diagram showing an extension exception trap processing.

FIG. 17 is a diagram showing a concept of extension exception trap processing. If an extension exception detection part 31 detects an erroneous non-definable instruction from a result of instruction decoding by the instruction decoder 4, the extension exception detection part 31 notifies a trap transition control part 32 of an occurrence of extension exception trap. After receiving the notification from the extension exception detection part 31, the trap transition control part 32 stops XAR register 1 from being rewritten by content of XAR update buffer 3, and also stops XAR register 1 and a register 6 from being accessed by the executing operation part 5, to return program processing to an extension exception trap processing routine.

Accordingly, an erroneous non-definable instruction can be prevented from being executed. Next, XASR register will be described for targeting a circumstance when a context of an executing program is switched. As a function of the OS scheduler, a program used for processing may be switched by a context switch. For example, a program used for processing can be changed by a context switch, so the state of a processor before the program is switched, that is, the state of registers needs to be saved in the memory. If the processor has a large number of registers, the number of registers for performing save and restoration processing also increases correspondingly, increasing a penalty of the context switch.

In the processing unit according to the present embodiment, 256 floating-point registers are divided into eight groups, each having 32 floating-point registers, to reduce the processing even slightly. Then, a bit showing whether any register in the group has been updated or not, that is, a dirty bit is provided to each group, providing 8 bits for as many groups as the number thereof.

These 8 dirty bits are called XFD (Extended Fpr Dirty) [7:0]. Further, when XG added by the fixed-point side is updated, a dirty bit xg dirty indicating the update is provided. These total of 9 bits are held in the new register XASR (eXtended Arithmetic Register Status Register).

Figure 18:
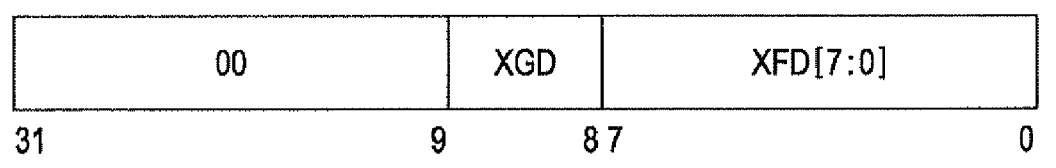

FIG. 18 shows the configuration of XASR register. In FIG. 18, bits 0 to 7 are XFD and the bit 0 corresponds to a block of % f0 to % f62, the bit 1 corresponds to a block of % f64 to % f126, ..., and the bit 7 corresponds to a block of % f448 to % f510. Value "0" is set to each bit of XFD by default, and when content of registers of each block changes, value "1" is set to the bit corresponding to the block to which the register whose content has changed belongs.

The bit 8 of XASR register is XGD, which is a dirty bit for fixed-point registers. Value "0" is set to each of bits 9 to 31. The processing unit according to the present embodiment references XASR register when restoring process of registers is performed, and restoring process is performed only on registers of blocks whose dirty bit has "1" set thereto.

Accordingly, compared with a case in which restoring process is performed on all registers, a load of restoring process is reduced. Data in XASR register is enabled to be read to a fixed-point register by RD-XASR instruction, and data in a fixed-point register is enabled to be written into XASR register by WR-XAR instruction. Viewing the dirty bits in XASR register makes it possible to check registers that need to be saved in the memory when the context switch is used.

Next, Write-XAR instruction will be described. In addition to the above-mentioned SXAR1 and SXAR2 instructions, Write-XAR instruction is defined in the processing unit as instructions to write information into XAR register. SXAR1 and SXAR2 instructions have extension information as immediate values in the instruction operation code. In contrast, Write-XAR instruction writes data in a fixed-point register into XAR register.

Write-XAR instruction has addresses of the source register 1 and source register 2 as immediate values and designates two fixed-point registers. Then, Write-XAR instruction reads data from the designated two fixed-point registers, calculates an exclusive OR (XOR) of the read data before writing an XOR result into XAR register. Then, one or two instructions following Write-XAR instruction are extended, like SXAR instruction, based on instruction extension information in XAR register written by Write-XAR instruction.

Write-XAR instruction writes a value determined from data stored in fixed-point registers into XAR register. Thus, by using Write-XAR instruction, processing to read content of TXAR (Trap XAR) register and to write a value based on the read content into XAR register can be performed.

Also, data processed by a fixed-point computing unit can be written into XAR register.

Figure 19:
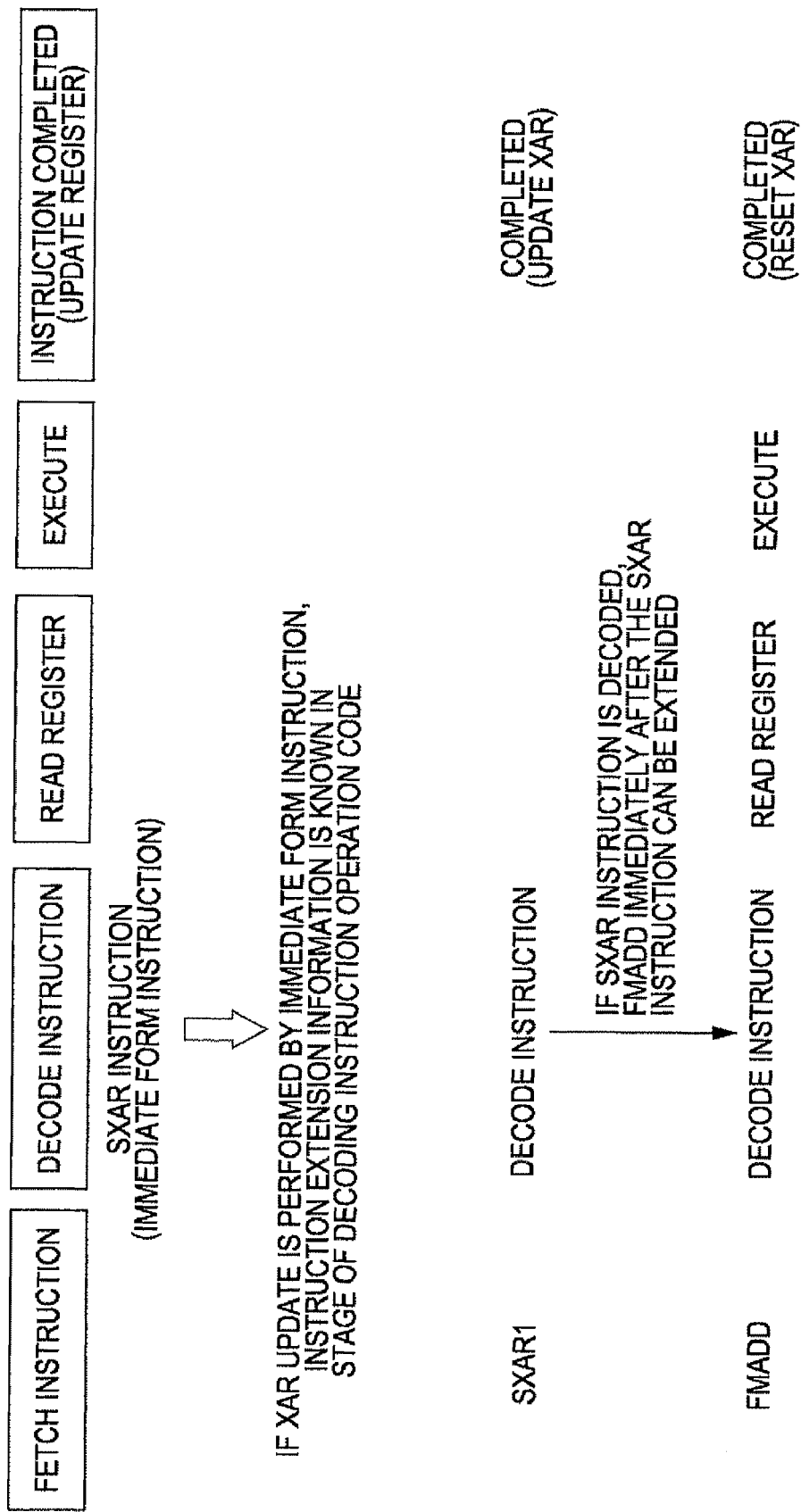
FIG. 19 is a diagram showing timing of instruction extension when instruction extension is performed by an SXAR instruction.

Next, timing of extending an instruction by SXAR instruction and Write-XAR instruction will be described. FIG. 19 is a diagram showing timing of instruction extension when instruction extension is performed by SXAR instruction. FIG. 19 shows an outline stage for instruction execution and processing performed during instruction execution by taking the time axis in the horizontal direction.

SXAR instructions, that is SXAR1 instruction and SXAR2 instruction, have instruction extension information as immediate values of instruction. Thus, in SXAR instruction, instruction extension information is known in an instruction decode stage where the instruction operation code is decoded. Therefore, the next instruction after SXAR instruction can be extended immediately after decoding SXAR instruction. Consequently, SXAR instruction and the first extension instruction following SXAR instruction are decoded almost simultaneously.

In the example in FIG. 19, SXAR1 instruction and the following FMADD instruction are decoded almost simultaneously, and these two instructions are completed almost simultaneously.

Figure 20:
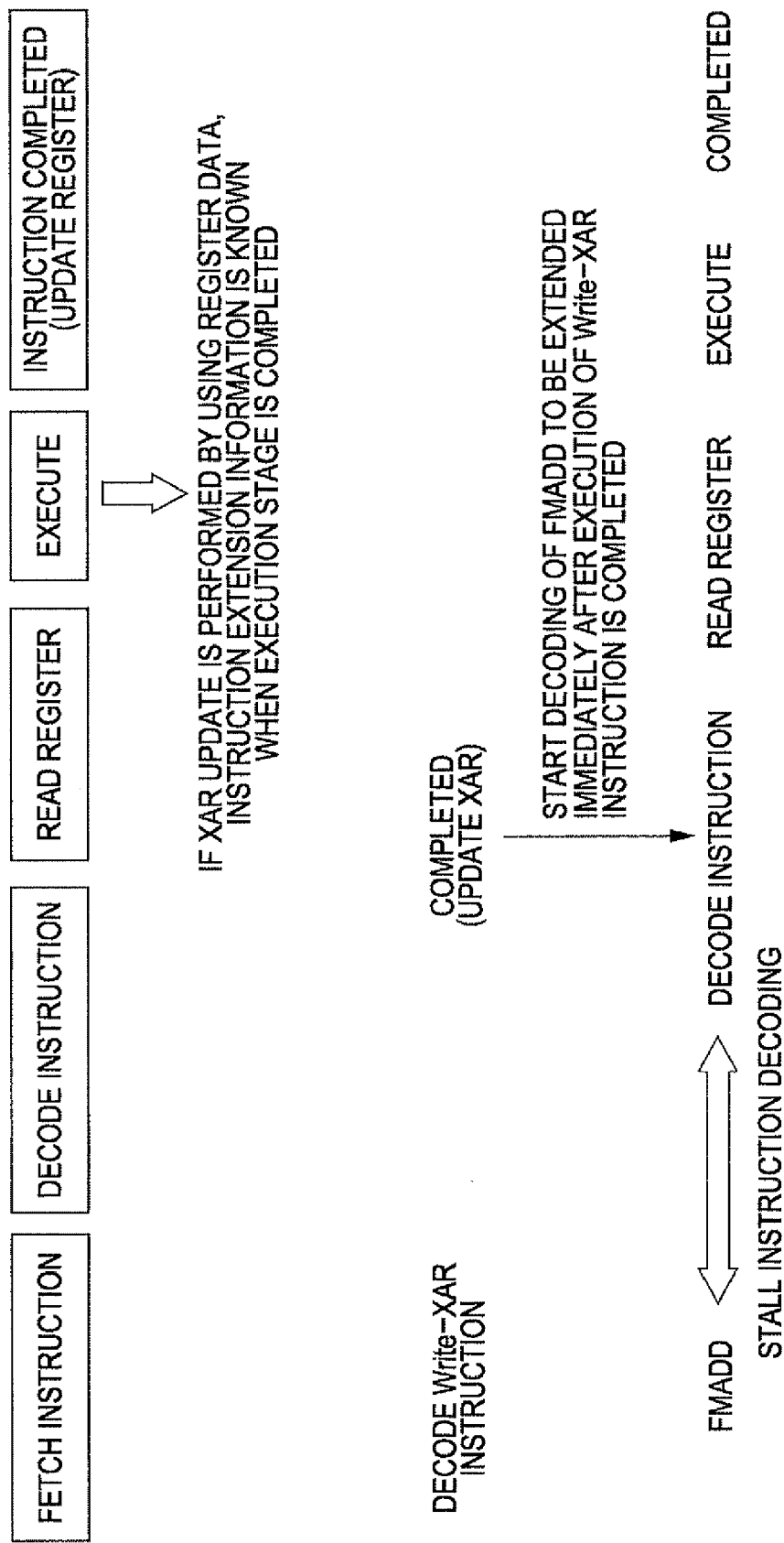
FIG. 20 is a diagram showing timing of instruction extension when instruction extension is performed by a Write-XAR instruction.

FIG. 20 is a diagram showing timing of instruction extension when instruction extension is performed by Write-XAR instruction. Like FIG. 19, FIG. 20 shows an outline stage for instruction execution and processing performed during instruction execution by taking the time axis in the horizontal direction.

Write-XAR instruction is an instruction for performing an XOR operation using fixed-point registers and for writing an operation result into XAR register. Thus, the value of instruction extension information is not determined before execution of the XOR operation by Write-XAR instruction is completed in the execution stage.

Thus, when Write-XAR instruction is used for instruction extension, the instruction extension information is determined after the execution stage of Write-XAR instruction is completed and thus, decoding of the first extension instruction is started immediately after the execution stage is completed.

In FIG. 20, instruction decoding of FMADD instruction following Write-XAR instruction is stalled until the execution stage of Write-XAR instruction is completed. Then, when the execution stage of Write-XAR instruction is completed, FMADD instruction enters the instruction decoding stage.

Figure 21:
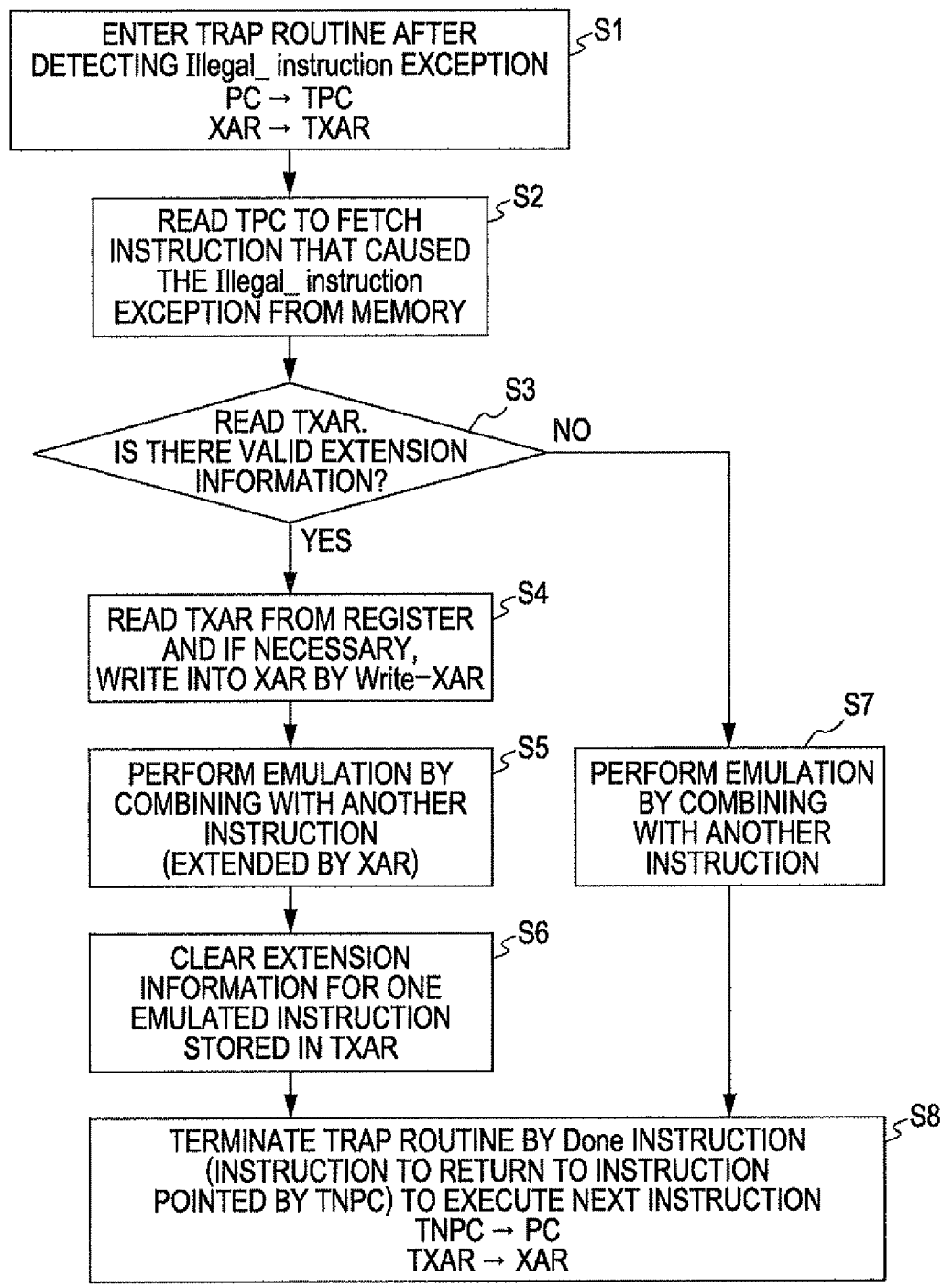
FIG. 21 is a flow chart showing an operation of an undefined instruction exception routine in software emulation.

Next, a case in which the processing unit according to the present embodiment is emulated by software is shown as an example of using Write-XAR instruction. FIG. 21 is a flow chart showing an operation of an undefined instruction exception routine in software emulation. When, after starting processing in FIG. 21, emulation software detects an undefined instruction (illegal_instruction) exception at S1, processing enters a trap routine of the undefined instruction exception. At this point, the value of the program counter PC is saved in TPC, and the value of XAR register is saved in stack TXAR.

Next, the emulation software reads the program counter value in TPC at S2 to fetch the instruction that caused the undefined instruction (illegal_instruction) exception from the memory. Then, the emulation software reads the value that is saved from XAR register from stack TXAR at S3. Then, if valid extension information is found in the read information (S3,Y), the value of stack TXAR is read into the register at S4 and, if necessary, the value is written back to XAR register by Write-XAR instruction.

Then, emulation is performed in this state at S5 by combining the extension instruction information stored in XAR register and another instruction. The instruction combined at this point is extended by the extension instruction information.

Then, the emulation software clears at S6 the extension instruction for one emulated instruction stored in stack TXAR before transferring process to S8.

If, on the other hand, valid extension information is not found in information read at S3 (S3, N), emulation is performed at S7 by combining the extension instruction information stored in XAR register and another instruction before transferring process to S8. The instruction combined at this point is not extended because no valid extension instruction information is stored in XAR register.

At S8, the trap routine is terminated by the Done instruction which is an instruction to return to an instruction pointed to by TNPC, to perform the next instruction of the main routine pointed to by TNPC. At this point, the value of TNPC returns to PC and the value of stack TXAR to XAR register. Since Write-XAR instruction can set any desired value to XAR register as described above, Write-XAR instruction can be used in a trap routine and for debugging.

Next, a debugger executed in the processing unit according to the present embodiment will be described. The debugger is a program used for development of software executed in the processing unit. The debugger replaces an instruction at an arbitrary position in a program to be debugged by a software trap instruction, "TA: Trap Always" in the example of JPS1, to check the register value and the like when the replaced instruction is executed while emulating the replacing instruction in the trap routine.

FIG. 22 is a diagram showing processing by a general debugger. If, in the example of FIG. 22, a debug trap should be performed at a point of a faddd instruction 41, the faddd instruction 41 is replaced by a software trap instruction TA as indicated by 42.

Accordingly, when TA instruction is executed, process jumps to a debug routine of the trap address instructed by the debugger and the debug routine collects data needed by the debugger, for example, register values. Then, after emulating the faddd instruction, the debug routine replaces TA instruction by the original faddd instruction. Debug processing is performed in this manner.

In instruction extension by XAR register in the processing unit according to the present embodiment, the instruction immediately after is always extended when XAR register has valid instruction extension information. Thus, if an instruction to be extended by instruction extension information of XAR register is replaced by TA instruction by the debugger function, an attempt is made to extend TA instruction by the instruction extension information of XAR register. Moreover, a software trap instruction uses a fixed-point register as a source register and thus, if the register extended address field points to the 256th register, an "illegal_action" trap may be caused.

That is, if TA instruction is extended, the original debugger function may not be fulfilled by changing trap address value or causing "illegal_action".

Thus, in the processing unit according to the present embodiment, the software trap instruction TA is specially defined to be handled as an instruction not to be extended, that is, to be executed by ignoring XAR extension information even if there is valid extension information in XAR register.

When a trap is not caused by a software trap instruction, the processing unit according to the present embodiment has specifications to unconditionally reset XAR register. When a debugger is used, a trap is always entered by the software trap instruction and XAR is stored in TXAR so that the value of XAR when the trap is entered can be read from TXAR by RD-TXAR instruction after the software trap is caused.

Figure 23:
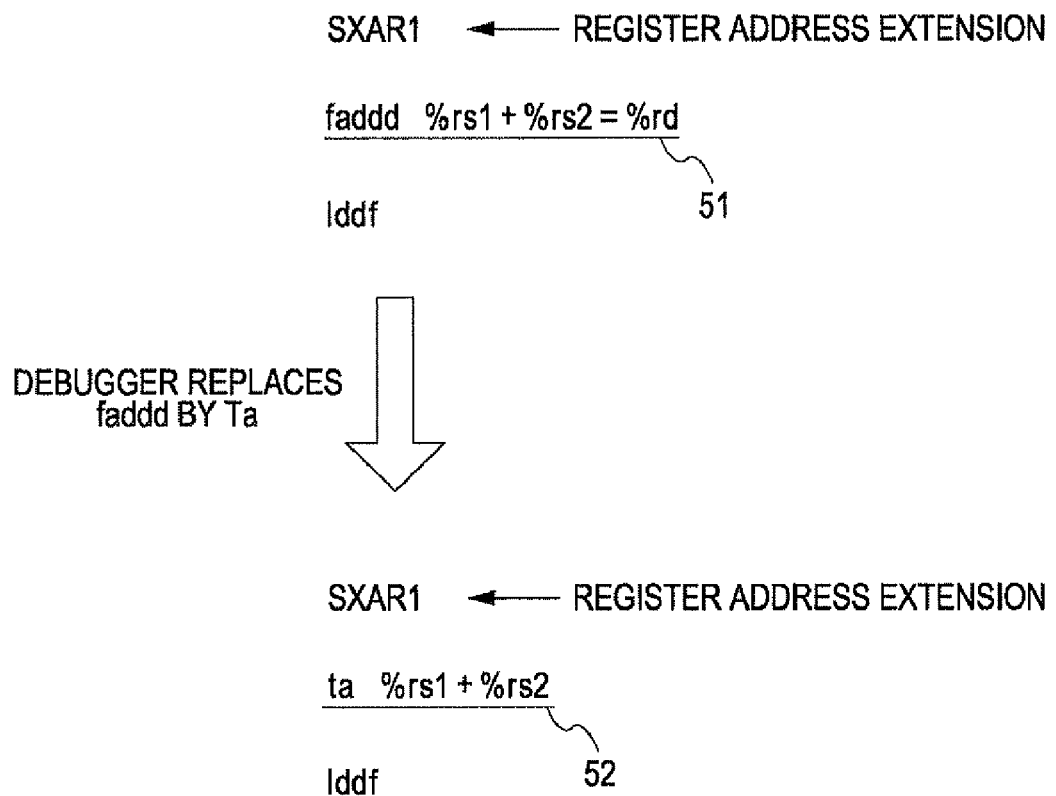
FIG. 23 is a diagram showing debugger processing on an instruction extended by the processing unit.

FIG. 23 shows debugger processing on an instruction extended by the processing unit in the present embodiment. In FIG. 23, it is assumed that debugging is performed at a point when an faddd instruction 51 is executed immediately after SXAR1 instruction. Also in this case, the debugger replaces the faddd instruction by TA instruction as indicated by 52.

If the address of the operand register of TA instruction should be extended by SXAR1 instruction, processing jumps to a trap address unintended by the debugger during execution of TA instruction. Thus, the present embodiment is defined to execute TA instruction by ignoring instruction extension information in XAR register. Accordingly, processing jumps to the correct trap address during execution of TA instruction.

According to the foregoing, the processing unit according to the present embodiment can extend an instruction while retaining the instruction as a fixed-length instruction.

In the above examples, up to two instructions are extended by SXAR2 instruction, but the processing unit according to the present embodiment is not limited to this. For example, three or more instructions may be extended, for example, by reducing the number of registers to be extended and/or not extending SIMD instructions.

Also in the above examples, when an extended instruction is executed, corresponding extension instruction information in XAR register is cleared, but instead of clearing all information, corresponding extension instruction information may be invalidated by clearing only F_VAL or S_VAL.

According to an aspect of the embodiments of the invention, any combinations of the described features, functions, operations, and/or benefits can be provided. The embodiments can be implemented as an apparatus (a machine) that includes computing hardware (i.e., a computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. A computing apparatus comprises a computer processor or controller (CPU) (e.g., a hardware logic circuitry based computer processor that processes or executes instructions, namely software), computer readable recording media, transmission communication media interface (network interface), and/or a display device, all in communication through a data communication bus. The results produced can be displayed on a display of the computing hardware. A program/software implementing the embodiments may be recorded on computer readable media comprising computer-readable recording media. The program/software implementing the embodiments may also be included/encoded and transmitted over transmission communication media.

According to an aspect of an embodiment, the processing unit is computer processor and a register refers to any area of any computer readable recording media of the computer processor and/or accessible by the computer processor that stores information/data. An apparatus (machine) may include the processing unit. Further, the described processes can be implemented by programming a computer to execute/process the processes as particular functions pursuant to instructions from program software and/or data structures described herein to create a new special purpose machine, namely to transform a general purpose machine into a special purpose machine. In particular, the processes when executed by the a computer processor transform the computer processor as an article into high-performance instruction extending processor as a different state and/or thing.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A processor comprising:
   an instruction decoder that decodes an extension instruction and decodes a subsequent instruction, which includes address information, subsequent to the extension instruction;
   an extension register that stores address extension information for extending the address information when the extension instruction is decoded by the instruction decoder; and
   an operation unit that extends the subsequent instruction so that the subsequent instruction designates a register, which stores an operand, concatenating the address information included in the subsequent instruction and the address extension information stored in the extension register
   wherein a plurality of subsequent instructions subsequent to the extension instruction and a plurality of address extension information for the plurality of subsequent instructions are stored in the extension register in response to decoding of the extension instruction.

2. The processor according to claim 1, wherein the extension register stores valid information indicating whether the address extension information is valid, and
   when the valid information indicates that the stored address instruction extension information is valid, the operation unit extends the subsequent instruction so that the subsequent instruction designates a register storing an operand to be operated by concatenating the address information included in the subsequent instruction and the address extension information stored in the extension register.

3. The processor according to claim 1, wherein when the extended subsequent instruction is completed, the stored address extension information is invalidated.

4. The processor according to claim 1, wherein the extension instruction includes address extension information for a general purpose register or a fixed-point register.

5. The processor according to claim 1, wherein each time the subsequent instruction is extended and then completed after being executed, the stored address extension information corresponding to the completed subsequent instruction from among the plurality of address extension information is invalidated.

6. The processor according to claim 1, further comprising:
a trap register that stores address extension information set to the extension register when a trap occurs between execution of the extension instruction and execution of the subsequent instruction.

7. The processor according to claim 6, wherein when the trap occurs and trap processing is started, the address extension information in the extension register is invalidated.

8. The processor according to claim 1, further comprising a trap transition control unit causing an extension violation exception trap when the subsequent instruction that can not be extended by the address extension information due to an instruction type is processed.

9. The processor according to claim 1, wherein the extension register further stores instruction extension information that indicates whether the subsequent instruction is an SIMD instruction that operates multiple data.

10. The processor according to claim 1, wherein the extension instruction further includes designation of a cache way from a plurality of cache ways when data is registered with a cache.

11. The processor according to claim 1, wherein the extension instruction includes the address extension information to be stored in the extension register as immediate values defined in an instruction operation code of the extension instruction.

12. A method of extending an instruction in a processor, the method comprising:
decoding an extension instruction;
storing address extension information for extending address information when the extension instruction is decoded;
decoding a subsequent instruction, which includes the address information, subsequent to the extension instruction; and
extending the decoded subsequent instruction so that the subsequent instruction designates a register, which stores an operand, by concatenating the address information included in the subsequent instruction and the address extension information stored in the extension register,
wherein a plurality of subsequent instructions subsequent to the extension instruction and a plurality of address extension information for the plurality of subsequent instructions are stored in the extension register in response to decoding of the extension instruction.

* * * * *

UNITED STATES PATENT AND TRADEMARK OFFICE
CERTIFICATE OF CORRECTION

PATENT NO. : 8,281,112 B2
APPLICATION NO. : 12/338245
DATED : October 2, 2012
INVENTOR(S) : Toshio Yoshida et al.

Page 1 of 1

It is certified that error appears in the above-identified patent and that said Letters Patent is hereby corrected as shown below:

In the Claims:

Column 18, Line 51, In Claim 1, delete "operand," and insert -- operand, by --, therefor.

Signed and Sealed this
Fourteenth Day of May, 2013

Teresa Stanek Rea
*Acting Director of the United States Patent and Trademark Office*